(12) United States Patent
Kim

(10) Patent No.: US 11,438,799 B2
(45) Date of Patent: Sep. 6, 2022

(54) METHOD AND APPARATUS FOR CONTROLLING DATA RECEIVING RATE IN MOBILE COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/123,566

(22) Filed: Dec. 16, 2020

(65) Prior Publication Data

US 2021/0105663 A1 Apr. 8, 2021

Related U.S. Application Data

(63) Continuation of application No. 16/373,075, filed on Apr. 2, 2019, now Pat. No. 10,887,794.

(30) Foreign Application Priority Data

Apr. 3, 2018 (KR) .................. 10-2018-0038745
Apr. 10, 2018 (KR) .................. 10-2018-0041800

(51) Int. Cl.
*H04W 28/06* (2009.01)
*H04W 80/02* (2009.01)
(Continued)

(52) U.S. Cl.
CPC ........... *H04W 28/06* (2013.01); *H04L 1/1685* (2013.01); *H04L 1/18* (2013.01); *H04W 28/0278* (2013.01); *H04W 80/02* (2013.01); *H04W 80/08* (2013.01)

(58) Field of Classification Search
CPC . H04W 28/06; H04W 28/0278; H04W 80/02; H04W 80/08; H04L 1/1685; H04L 1/18
See application file for complete search history.

(56) References Cited

U.S. PATENT DOCUMENTS 7,876,684 B2 * 1/2011 Ishii .................. H04L 47/25
370/252
7,987,284 B2 * 7/2011 Ogawa .............. H04L 47/2416
709/233
(Continued)

FOREIGN PATENT DOCUMENTS

KR 10-2010-0009866 A 1/2010
WO 2005-029789 A1 3/2005

OTHER PUBLICATIONS

International Search Report dated Aug. 23, 2019, issued in an International application No. PCT/KR2019/003923.
(Continued)

*Primary Examiner* — Chandrahas B Patel
(74) *Attorney, Agent, or Firm* — Jefferson IP Law, LLP

(57) ABSTRACT

A method of controlling a data receiving rate by a terminal in a wireless communication system is provided. The method includes determining whether a buffer overflow occurred based on at least one of a remaining capacity of a buffer or a capacity of data stored in the buffer, based on determining that the buffer overflow occurred, performing data discard or a request to stop a data transmission, from a lower entity of the terminal, and requesting data form a base station, in response to the buffer overflow being resolved.

18 Claims, 16 Drawing Sheets

(51) Int. Cl.
   *H04L 1/18*    (2006.01)
   *H04L 1/16*    (2006.01)
   *H04W 80/08*   (2009.01)
   *H04W 28/02*   (2009.01)

(56)            References Cited

U.S. PATENT DOCUMENTS 8,065,595 B2 *   11/2011  Kim ..................... H04L 1/1819
                                                           714/790
   9,398,488 B2      7/2016  Shen et al.
   2007/0002864 A1   1/2007  Yi et al.
   2010/0315948 A1  12/2010  Yi et al.
   2014/0165113 A1   6/2014  Chennupati
   2014/0347989 A1  11/2014  Shen et al.
   2020/0022043 A1   1/2020  Pelletier et al.

OTHER PUBLICATIONS

Extended European Search Report dated Feb. 18, 2021, issued in European Application No. 19780535.1.

* cited by examiner

METHOD AND APPARATUS FOR CONTROLLING DATA RECEIVING RATE IN MOBILE COMMUNICATION SYSTEM

CROSS-REFERENCE TO RELATED APPLICATION(S)

This application is a continuation application of prior application Ser. No. 16/373,075, filed on Apr. 2, 2019, and is based on and claims priority under 35 U.S.C. § 119(a) of a Korean patent application number 10-2018-0038745, filed on Apr. 3, 2018, in the Korean Intellectual Property Office, and of a Korean patent application number 10-2018-0041800, filed on Apr. 10, 2018, in the Korean Intellectual Property Office, the disclosure of each of which is incorporated by reference herein in its entirety.

BACKGROUND

1. Field

The disclosure relates to a method and apparatus for controlling a receiving rate to handle a buffer overflow when an overflow occurs in a user equipment (UE) buffer in a mobile communication system.

2. Description of Related Art

To meet the increase in demand with respect to wireless data traffic after the commercialization of 4th generation (4G) communication systems, considerable efforts have been made to develop improved 5th generation (5G) communication systems or pre-5G communication systems. This is one reason why '5G communication systems' or 'pre-5G communication systems' is called 'beyond 4G network communication systems', 'post long term evolution (LTE) systems', or 'next generation mobile communication systems'. In order to achieve a high data rate, 5G communication systems are being developed to be implemented in a super-high frequency (SHF) band (millimeter wave (mm-Wave)), e.g., a band of 60 GHz. In order to reduce path loss in such a SHF band and to increase a propagation distance of electric waves in 5G communication systems, various technologies such as beamforming, massive multiple input multiple output (massive MIMO), full dimensional MIMO (FD-MIMO), array antennas, analog beamforming, and large scale antennas are being studied. In order to improve system networks for 5G communication systems, various technologies such as evolved small cells, advanced small cells, cloud radio access networks (cloud RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency shift keying (FSK) and quadrature amplitude modulation (QAM) (FQAM) and sliding window superposition coding (SWSC) and advanced access technologies such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology, in which the IoT technology is combined with, for example, technology for processing big data through connection with a cloud server, is being newly provided. In order to implement the IoT, various technological elements such as a sensing technology, wired/wireless communication and network infrastructures, a service interface technology, and a security technology are required. In recent years, technologies related to sensor networks for connecting objects, machine-to-machine (M2M) communication, and machine type communication (MTC) have been studied. In the IoT environment, intelligent Internet technology (IT) services may be provided to collect and analyze data obtained from connected objects and thus to create new values in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, MTC, etc. are implemented by using 5G communication technology including beamforming, MIMO, array antennas, etc. Application of a cloud RAN as the above-described big data processing technology may be an example of convergence of the 5G communication technology and the IoT technology.

As described above, with the development of wireless communication systems, various services are now providable, and thus, a way of smoothly providing these services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for a next generation mobile communication system that supports a service requiring a high data transfer rate and low transmission delay. An overflow of a buffer may occur in a user equipment (UE) due to the high data transfer rate, and a method of solving the overflow while satisfying the low transmission delay required by the system is required.

Additional aspects will be set forth in part in the description which follows and, in part, will be apparent from the description, or may be learned by practice of the presented embodiments.

In accordance with an aspect of the disclosure, a method of controlling a data receiving rate by a terminal in a wireless communication system is provided. The method includes determining whether a buffer overflow occurred based on at least one of a remaining capacity of a buffer or a capacity of data stored in the buffer, based on determining that the buffer overflow occurred, performing data discard or a request to stop a data transmission, from a lower entity of the terminal, and requesting data from a base station, in response to the buffer overflow being resolved.

The performing may include transmitting the request to stop the data transmission from a physical entity included in the lower entity, through a layer 1 (L1) signaling.

The performing may include discarding, at a media access control (MAC) entity included in the lower entity, data received after it is determined that the buffer overflow occurred, wherein the method may further include transmitting information regarding the discarded data to the base station.

The performing may include, in response to a radio link control (RLC) entity included in the lower entity, being operated in an acknowledged mode (AM), discarding data received after it is determined that the buffer overflow occurred, wherein the method may further include stopping transmission of a data status report to the base station.

The discarding may include discarding data except a control packet data unit (PDU) received after it is determined that the buffer overflow occurred.

The method may further include storing a sequence number of the discarded data and in response to data previously received from the base station being received redundantly and a poll bit being included in the header of the redundantly received data, transmitting the data status report to the base station.

The method may further include in response to the data being received redundantly and the poll bit being included in the re-received data, re-transmitting the data status report to the base station.

The performing may include, in response to an RLC entity, included in the lower entity, being operated in an unacknowledged mode (UM), discarding at least one piece of data received before it is determined that the buffer overflow occurred.

The method may further include transmitting, to an upper entity, data received before it is determined that the buffer overflow occurred.

In accordance with another aspect of the disclosure, a method of controlling a data receiving rate by a base station in a wireless communication system is provided. The method includes transmitting data to a terminal, receiving a request to stop data transmission from a lower entity of the terminal, based on a buffer overflow at the terminal, the buffer flow occurring based on at least one of a remaining capacity of a buffer or a capacity of data stored in a buffer at the terminal, and stopping the data transmission.

In accordance with another aspect of the disclosure, a terminal for controlling a data receiving rate is provided. The terminal includes a transceiver and a processor coupled with the transceiver and configured to determine whether a buffer overflow occurred based on at least one of a remaining capacity of a buffer or a capacity of data stored in the buffer, based on determining that the buffer overflow occurred, perform data discard or a request to stop a data transmission, from a lower entity of the terminal and control the transceiver to request data from a base station, in response to the buffer overflow being resolved.

The processor may be further configured to control the transceiver to transmit the request to stop the data transmission from a physical entity included in the lower entity, through a L1 signaling.

The processor may be further configured to discard, at a MAC entity included in the lower entity, data received after it is determined that the buffer overflow occurred and control the transceiver to transmit information regarding the discarded data to the base station.

The processor may be further configured to in response to a RLC entity, included in the lower entity, being operated in an AM, discard data received after it is determined that the buffer overflow occurred, and stop transmission of a data status report to the base station.

The processor may be further configured to discard data except a control PDU received after it is determined that the buffer overflow occurred.

The processor may be further configured to store a sequence number of the discarded data, and in response to data previously received from the base station being received redundantly and a poll bit being included in the header of the redundantly received data, control the transceiver to transmit the data status report to the base station.

The processor may be further configured to, in response to the data being received redundantly and the poll bit being included in the re-received data, control the transceiver to re-transmit the data status report to the base station.

The processor may be further configured to, in response to an RLC entity, included in the lower entity, being operated in an UM, discard at least one data received before it is determined that the buffer overflow occurred.

The processor may be further configured to control the transceiver to transmit, to an upper entity, data received before it is determined that the buffer overflow occurred.

In accordance with another aspect of the disclosure, a base station for controlling a data receiving rate is provided. The base station includes a transceiver and a processor coupled with the transceiver and configured to control the transceiver to transmit data to a terminal, and control the transceiver to receive a request to stop data transmission from a lower entity of the terminal, based on determining that a buffer overflow occurred at the terminal, the buffer flow occurring based on at least one of a remaining capacity of a buffer or a capacity of data stored in the buffer at the terminal, and stop the data transmission.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1O is a block diagram of a UE according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, terms identifying access nodes, terms indicating network entities, terms indicating messages, terms indicating interfaces between network entities, terms indicating various types of identification information, etc. are used merely for convenience of explanation. Therefore, the disclosure is not limited to these terms and other terms having technically equivalent meanings may also be used.

To facilitate explanation, the disclosure uses terms and names defined in and derived from the 3rd generation partnership project (3GPP) long term evolution (LTE) standards. However, the disclosure is not limited to these terms and names but may be equally applied to systems according to other standards. In the disclosure, an evolved nodes B (eNB) may be used in combination with a next generation node B (gNB) for convenience of description. In other words, a base station described as an eNB may also represent a gNB.

Figure 1A:
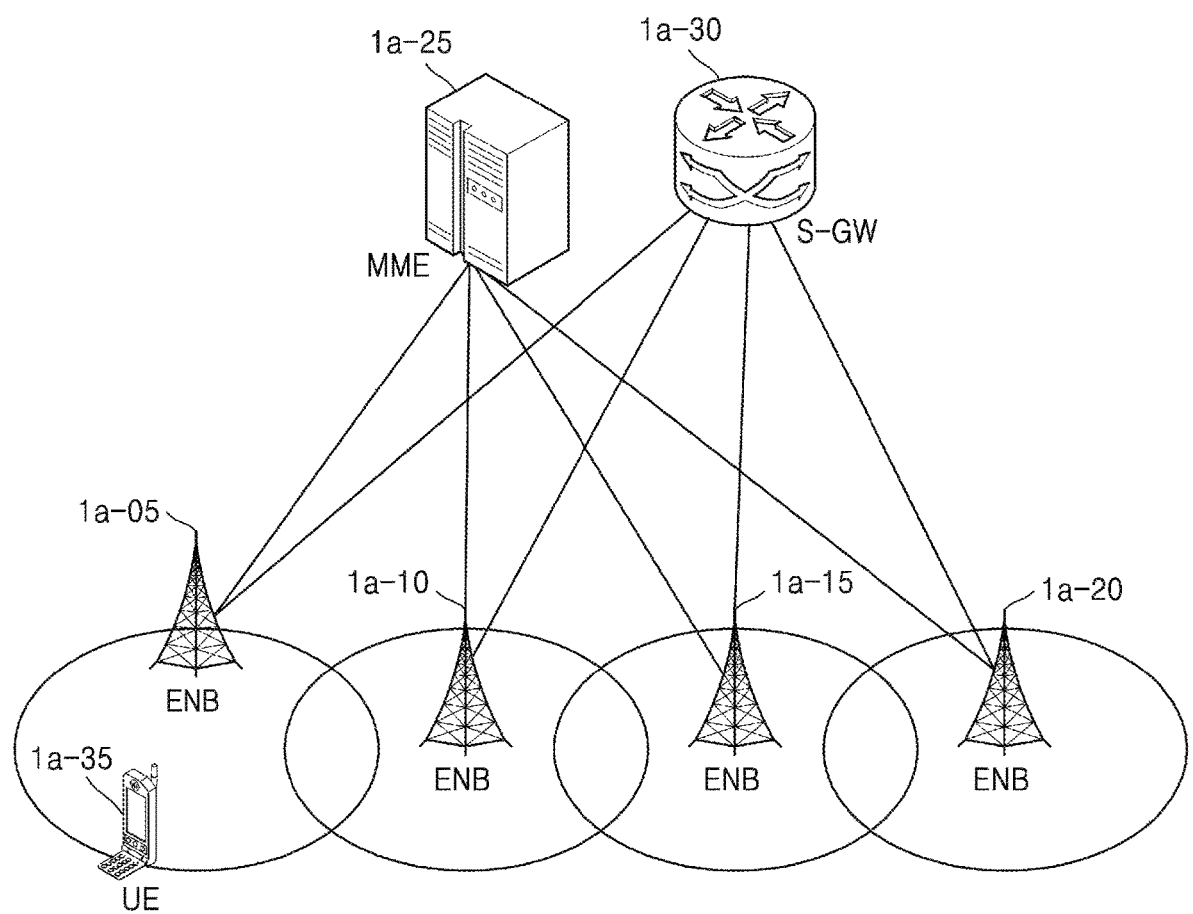
FIG. 1A is a diagram of a structure of a long term evolution (LTE) system according to an embodiment of the disclosure.

FIG. 1A is a diagram of a structure of an LTE system according to an embodiment of the disclosure.

Referring to FIG. 1A, a radio access network (RAN) of the LTE system includes evolved base stations (e.g., eNBs or nodes B) $1a$-05, $1a$-10, $1a$-15, and $1a$-20, a mobility management entity (MME) $1a$-25, and a serving-gateway (S-GW) $1a$-30. A user equipment (UE) or mobile station (MS) $1a$-35 may access an external network via the eNB $1a$-05, $1a$-10, $1a$-15, or $1a$-20 and the S-GW $1a$-30.

Referring to FIG. 1A, each of the eNBs $1a$-05, $1a$-10, $1a$-15, and $1a$-20 corresponds to an existing node B of a universal mobile telecommunications system (UMTS). Each eNB $1a$-05, $1a$-10, $1a$-15, or $1a$-20 is connected to the UE $1a$-35 through radio channels and may perform complex functions compared to the existing node B. Because all user traffic data including real-time services such as voice over Internet protocol (VoIP) is serviced through shared channels in the LTE system, an entity for collating buffer status information of UEs, available transmission power status information, channel status information, etc. and performing scheduling is required and each of the eNBs $1a$-05, $1a$-10, $1a$-15, and $1a$-20 serves as such an entity. A single eNB generally controls multiple cells. For example, the LTE system may use radio access technology such as orthogonal frequency-division multiplexing (OFDM) at a bandwidth of 20 MHz to achieve a data rate of 100 Mbps. The LTE system may also use adaptive modulation & coding (AMC) to determine a modulation scheme and a channel coding rate in accordance with a channel status of the UE $1a$-35. The S-GW $1a$-30 is an entity for providing data bearers and may configure or release the data bearers under the control of the MME $1a$-25. The MME $1a$-25 is an entity for performing a mobility management function and various control functions for the UE $1a$-35 and may be connected to the eNBs $1a$-05, $1a$-10, $1a$-15, and $1a$-20.

Figure 1B:
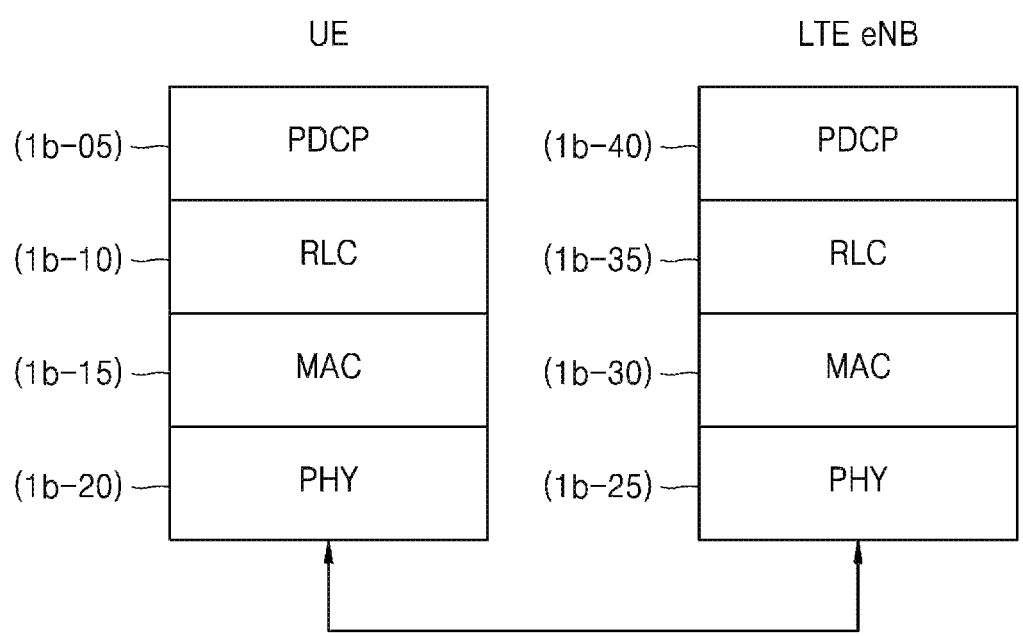
FIG. 1B is a diagram of a radio protocol architecture in an LTE system, according to an embodiment of the disclosure.

FIG. 1B is a diagram of a radio protocol architecture in an LTE system, according to an embodiment of the disclosure.

Referring to FIG. 1B, the radio protocol architecture of the LTE system may include packet data convergence protocol (PDCP) entities $1b$-05 and $1b$-40, radio link control (RLC) entities $1b$-10 and $1b$-35, and media access control (MAC) entities $1b$-15 and $1b$-30 respectively for a UE and an eNB. The PDCP entity $1b$-05 or $1b$-40 is in charge of IP header compression/decompression, etc. Main functions of the PDCP entity $1b$-05 or $1b$-40 are summarized below.

Header compression and decompression: robust header compression (ROHC) only

Transfer of user data

In-sequence delivery of upper layer packet data units (PDUs) at PDCP re-establishment procedure for RLC acknowledged mode (AM)

For split bearers in dual connectivity (DC) (only support for RLC AM): PDCP PDU routing for transmission and PDCP PDU reordering for reception Duplicate detection of lower layer service data units (SDUs) at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink (UL)

The RLC entity 1b-10 or 1b-35 may perform, for example, an automatic repeat request (ARQ) operation by reconfiguring PDCP PDUs to appropriate sizes. Main functions of the RLC entity 1b-10 or 1b-35 are summarized below.

Transfer of upper layer PDUs

Error Correction through ARQ (only for AM data transfer)

Concatenation, segmentation and reassembly of RLC SDUs (only for unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC entity 1b-15 or 1b-30 is connected to multiple RLC entities configured for a single UE and may multiplex RLC PDUs into a MAC PDU and demultiplex the RLC PDUs from the MAC PDU. Main functions of the MAC entity 1b-15 or 1b-30 are summarized below.

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through hybrid ARQ (HARQ)

Priority handling between logical channels of one UE

Priority handling between UEs by means of dynamic scheduling

Multimedia broadcast multicast service (MBMS) service identification

Transport format selection

Padding

A physical (PHY) entity 1b-20 or 1b-25 may channel-code and modulate upper entity data into OFDM symbols and transmit the OFDM symbols through a radio channel, or demodulate OFDM symbols received through a radio channel and channel-decode and deliver the OFDM symbols to an upper entity.

Figure 1C:
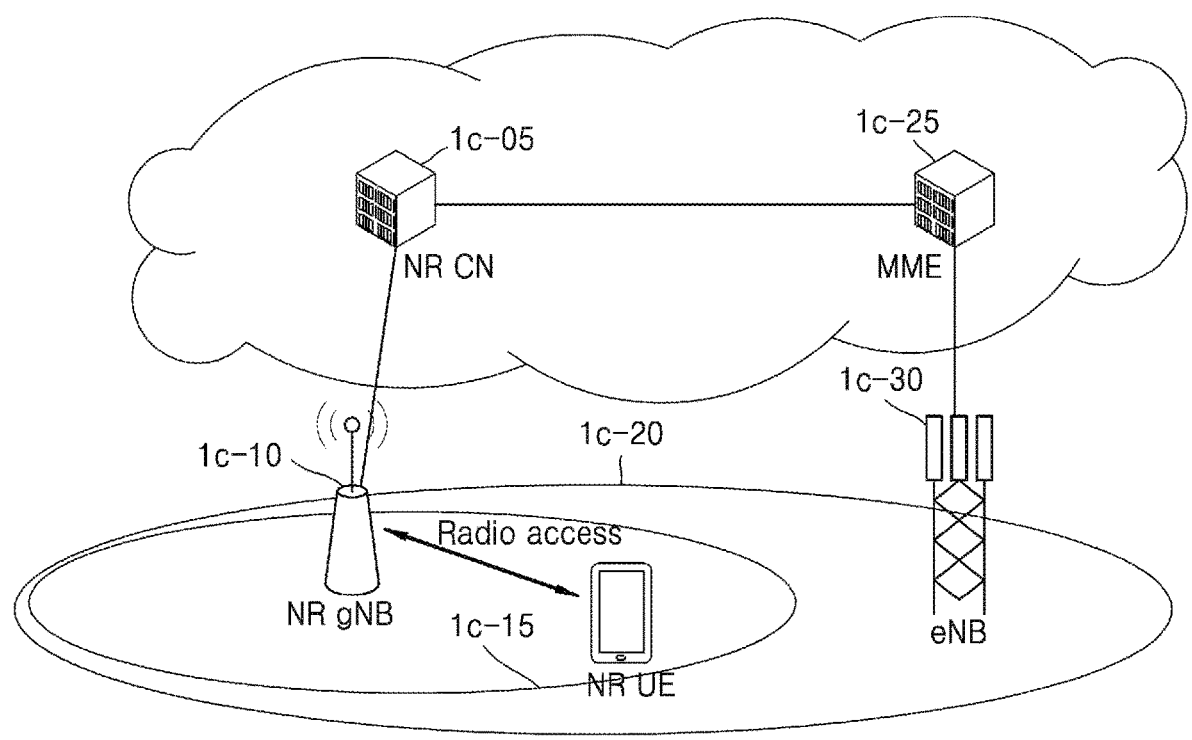
FIG. 1C is a diagram of a structure of a next generation mobile communication system according to an embodiment of the disclosure.

FIG. 1C is a diagram of a structure of a next generation mobile communication system according to an embodiment of the disclosure.

Referring to FIG. 1C, a RAN of the next generation mobile communication system (e.g., a new radio (NR) or 5th generation (5G) system) may include a NR node B (NR NB) or NR gNB 1c-10 and a NR core network (NR CN) or next generation core network (NG CN) 1c-05. A NR UE or UE 1c-15 may access an external network via the NR gNB 1c-10 and the NR CN 1c-05.

Referring to FIG. 1C, the NR gNB 1c-10 may correspond to an evolved node B (eNB) of an existing LTE system. The NR gNB 1c-10 is connected to the NR UE 1c-15 through radio channels and may provide superior services compared to an existing node B. Because all user traffic data is serviced through shared channels in the next generation mobile communication system, an entity for collating buffer status information of UEs, available transmission power status information, channel status information, etc. and performing scheduling is required and such operations may be performed by the NR gNB 1c-10. A single NR gNB may control multiple cells.

A bandwidth greater than the maximum bandwidth of LTE may be given to achieve a current ultrahigh data rate, and beamforming technology may be added to radio access technology such as OFDM. AMC may also be used to determine a modulation scheme and a channel coding rate in accordance with a channel status of the NR UE 1c-15. The NR CN 1c-05 may perform functions such as mobility support, bearer setup, and quality of service (QoS) setup. The NR CN 1c-05 is an entity for performing a mobility management function and various control functions for the NR UE 1c-15 and may be connected to multiple NR gNBs. The next generation mobile communication system may cooperate with the existing LTE system, and the NR CN 1c-05 may be connected to an MME 1c-25 through a network interface. The MME 1c-25 may be connected to an existing eNB 1c-30 having a cell coverage 1c-20.

Figure 1D:
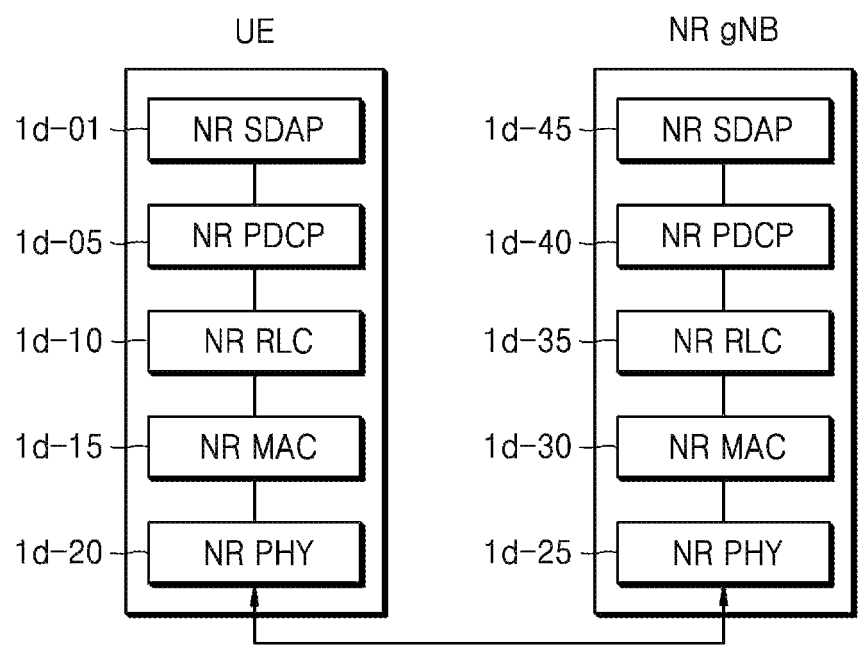
FIG. 1D is a diagram of a radio protocol architecture of a next generation mobile communication system according to an embodiment of the disclosure.

FIG. 1D is a diagram of a radio protocol architecture of a next generation mobile communication system according to an embodiment of the disclosure.

Referring to FIG. 1D, the radio protocol architecture of the next generation mobile communication system may include NR service data adaptation protocol (SDAP) entities 1d-01 and 1d-45, NR PDCP entities 1d-05 and 1d-40, NR RLC entities 1d-10 and 1d-35, NR MAC entities 1d-15 and 1d-30, and NR PHY entities 1d-20 and 1d-25 respectively for a UE and a NR gNB.

Main functions of the NR SDAP entities 1d-01 and 1d-45 may include some of the following functions.

Transfer of user plane data

Mapping between a QoS flow and a data radio bearer (DRB) for both downlink (DL) and UL Marking QoS flow ID in both DL and UL packets Reflective QoS flow to DRB mapping for the UL SDAP PDUs With respect to an SDAP entity, the UE may receive, via a radio resource control (RRC) message, setting on whether to use a header of the SDAP entity or use a function of the SDAP entity for each PDCP entity, bearer, or logical channel. When an SDAP header is set, the UE may instruct a non-access stratum (NAS) reflective QoS 1-bit indicator and an access stratum (AS) reflective QoS 1-bit indicator of the SDAP header to update or reset mapping information regarding the data bearer and the QoS flow of UL and DL. The SDAP header may include QoS flow ID indicating QoS. QoS information may be used as data processing priority information, scheduling information, etc. for supporting a smooth service.

Meanwhile, main functions of the NR PDCP entity 1d-05 or 1d-40 may include some of the following functions.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in UL

The reordering function of the NR PDCP entity 1d-05 or 1d-40 refers to a function of reordering PDCP PDUs received from a lower entity, on a PDCP sequence number (SN) basis. The reordering function may include a function of delivering the reordered data to an upper entity in order or a function of immediately delivering the reordered data without considering an order. Also, the reordering function may include a function of recording missing PDCP PDUs by reordering the PDCP PDUs and a function of reporting status information of the missing PDCP PDUs to a transmitter. Further, the reordering function may include a function of requesting to retransmit the missing PDCP PDUs.

Main functions of the NR RLC entity 1d-10 or 1d-35 may include at least some of the following functions.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery function of the NR RLC entity 1d-10 or 1d-35 indicates a function of delivering RLC SDUs received from a lower entity, to an upper entity in order and may include a function of reassembling multiple RLC SDUs segmented from an RLC SDU and delivering the RLC SDU when the segmented RLC SDUs are received. Also, the in-sequence delivery function may include a function of reordering received RLC PDUs on a RLC SN or PDCP SN basis and a function of recording missing RLC PDUs by reordering the RLC PDUs. Also, the in-sequence delivery function may include a function of reporting status information of the missing RLC PDUs to a transmitter and a function of requesting to retransmit the missing RLC PDUs. The in-sequence delivery function may include a function of delivering only RLC SDUs previous to a missing RLC SDU, to the upper entity in order, when the missing RLC SDU exists. Also, the in-sequence delivery function may include a function of delivering all RLC SDUs received before a timer is started, to the upper entity in order, although a missing RLC SDU exists, when a certain timer is expired, or a function of delivering all RLC SDUs received up to a current time, to the upper entity in order, although a missing RLC SDU exists, when a certain timer is expired. Further, the NR RLC entity 1d-10 or 1d-35 may process the RLC PDUs in order of reception (in order of arrival regardless of sequence numbers) and deliver the RLC PDUs to a PDCP entity out of order (out-of sequence delivery), and reassemble segments received or stored in a buffer, into a whole RLC PDU and process and deliver the RLC PDU to the PDCP entity. The NR RLC entity 1d-10 or 1d-35 may not have a concatenation function, and the concatenation function may be performed by the NR MAC entity 1d-15 or 1d-30 or be replaced with a multiplexing function of the NR MAC entity 1d-15 or 1d-30.

The out-of-sequence delivery function of the NR RLC entity 1d-10 or 1d-35 denotes a function of delivering the RLC SDUs received from the lower entity, to the upper entity out of order. The out-of-sequence delivery function may include a function of reassembling multiple RLC SDUs segmented from an RLC SDU and delivering the RLC SDU when the segmented RLC SDUs are received. Also, the out-of-sequence delivery function may include a function of storing RLC SNs or PDCP SNs of received RLC PDUs and recording missing RLC PDUs by ordering the RLC PDUs.

The NR MAC entity 1d-15 or 1d-30 may be connected to multiple NR RLC entities configured for a single UE, and main functions of the NR MAC entity 1d-15 or 1d-30 may include at least some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY entity 1d-20 or 1d-25 may channel-code and modulate upper entity data into OFDM symbols and transmit the OFDM symbols through a radio channel. Also, the NR PHY entity 1d-20 or 1d-25 may demodulate OFDM symbols received through a radio channel and channel-decode and deliver the OFDM symbols to an upper entity.

In the disclosure, a transmitter may be an eNB or UE, and a receiver may be an eNB or UE. In other words, the disclosure may include both a case where the transmitter is an eNB and the receiver is a UE (DL data transmission scenario) and a case where the transmitter is a UE and the receiver is an eNB (UL data transmission scenario). The transmitter may indicate an eNB or UE and the receiver may indicate an eNB or UE.

Figure 1E:
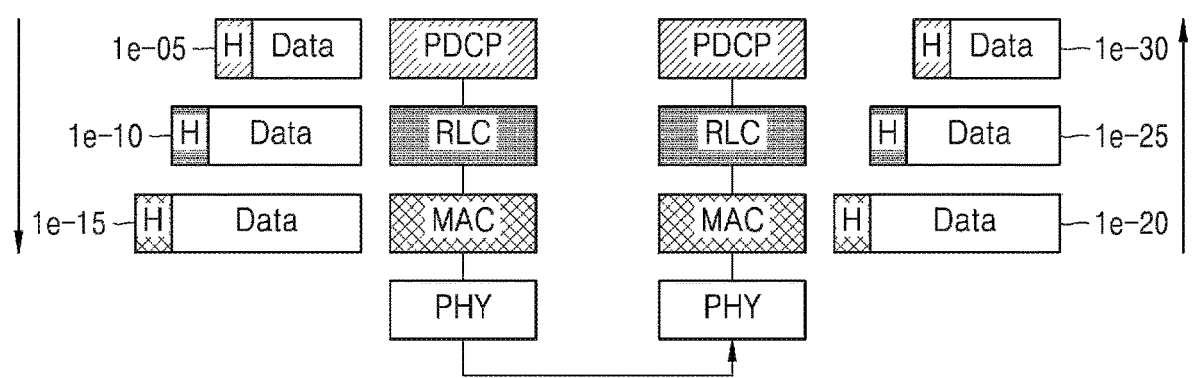
FIG. 1E is a diagram for describing procedures of data being processed in each entity in a next generation mobile communication system, according to an embodiment of the disclosure.

FIG. 1E is a diagram for describing procedures of data being processed in each entity in a next generation mobile communication system, according to an embodiment of the disclosure.

Referring to FIG. 1E, when an IP packet arrives at a PDCP entity, a PDCP entity may perform the functions of a PDCP entity as described above with reference to FIG. 1D, configure data such as PDCP PDU 1e-05 by configuring a PDCP header, and deliver the PDCP PDU 1e-05 to a lower entity. In an RLC entity that is a lower entity of the PDCP entity, the entire PDCP PDU 1e-05 received from the PDCP entity is recognized as one data, performs the functions of an RLC entity as described above with reference to FIG. 1D, configures an RLC PDU 1e-10 by configuring an RLC header, and delivers the RLC PDU 1e-10 to a lower entity. Upon receiving the RLC PDU 1e-10 from the RLC entity, a MAC entity that is a lower entity of the RLC entity may recognize the entire received RLC PDU 1e-10 as one data and perform the functions of a MAC entity described above with reference to FIG. 1D. Also, the MAC entity may complete a MAC PDU 1e-15 by configuring a MAC sub-header and deliver the MAC PDU 1e-15 to a lower entity. The PDCP entity and the RLC entity may use inter-entity independent sequence numbers respectively for the PDCP header and the RLC header (a PDCP sequence number and an RLC sequence number), and may align an order of data based on sequence numbers, search for redundancy, identify missing data, and request retransmission.

Upon receiving a MAC PDU 1e-20 from a lower entity, a MAC entity at a receiver of FIG. 1E may read a MAC header of the MAC PDU, consider the remaining in the MAC PDU as data, and deliver the data to an RLC entity that is an upper entity. Upon receiving an RLC PDU 1e-25, the RLC entity may read only an RLC header corresponding to the RLC entity, perform corresponding functions, and deliver a PDCP PDU 1e-30 to an upper entity. Similarly, a PDCP entity may read only a PDCP header, perform corresponding functions, and deliver the remaining data to an upper entity except the PDCP header.

As described above, each entity of the next generation mobile communication system reads only a header corresponding to each entity, and is unable to read a header or data of another entity. Thus, each entity may manage and process independent information.

Figure 1F:
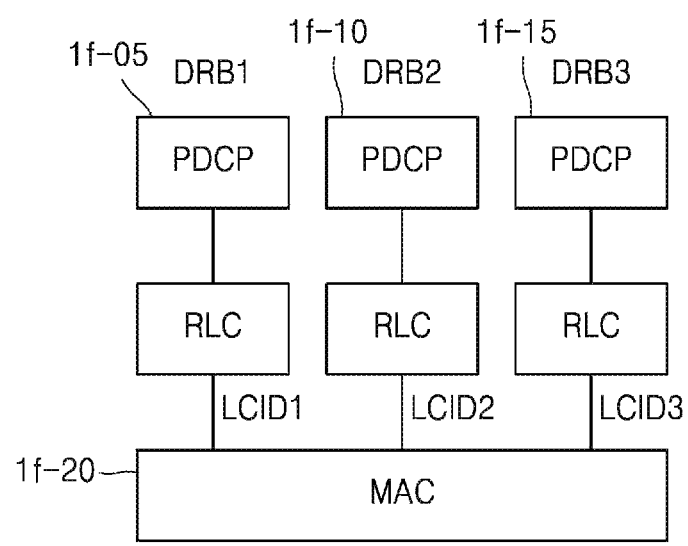
FIG. 1F is a diagram for describing a relationship between a general packet data convergence protocol (PDCP) entity, a radio link control (RLC) entity, and a media access control (MAC) entity according to an embodiment of the disclosure.

FIG. 1F is a diagram for describing a relationship between a general PDCP entity, an RLC entity, and a MAC entity according to an embodiment of the disclosure.

Referring to FIG. 1F, a UE or eNB may each use a concept of bearer to satisfy QoS required for each supported service to transmit, receive, and process data in bearer units. Each bearer is distinguished via DRB IDs 1*f*-05, 1*f*-10, and 1*f*-15 as shown in FIG. 1F or via signaling radio bearer (SRB) IDs, and may include an independent PDCP entity and RLC entity.

Also, a plurality of bearers or a plurality of PDCP/RLC entities may be connected to one MAC entity 1*f*-20 to transmit, receive, and process data, and the MAC entity 1*f*-20 may distinguish the plurality of bearers or PDCP/RLC entities via logical channel identifiers (LCIDs). In other words, the MAC entity 1*f*-20 may multiplex and then transmit data received from the plurality of RLC entities while transmitting the data. Also, the MAC entity 1*f*-20 may de-multiplex received data and perform data processing by transmitting data distinguished according to LCIDs to respective RLC entities.

Figure 1G:
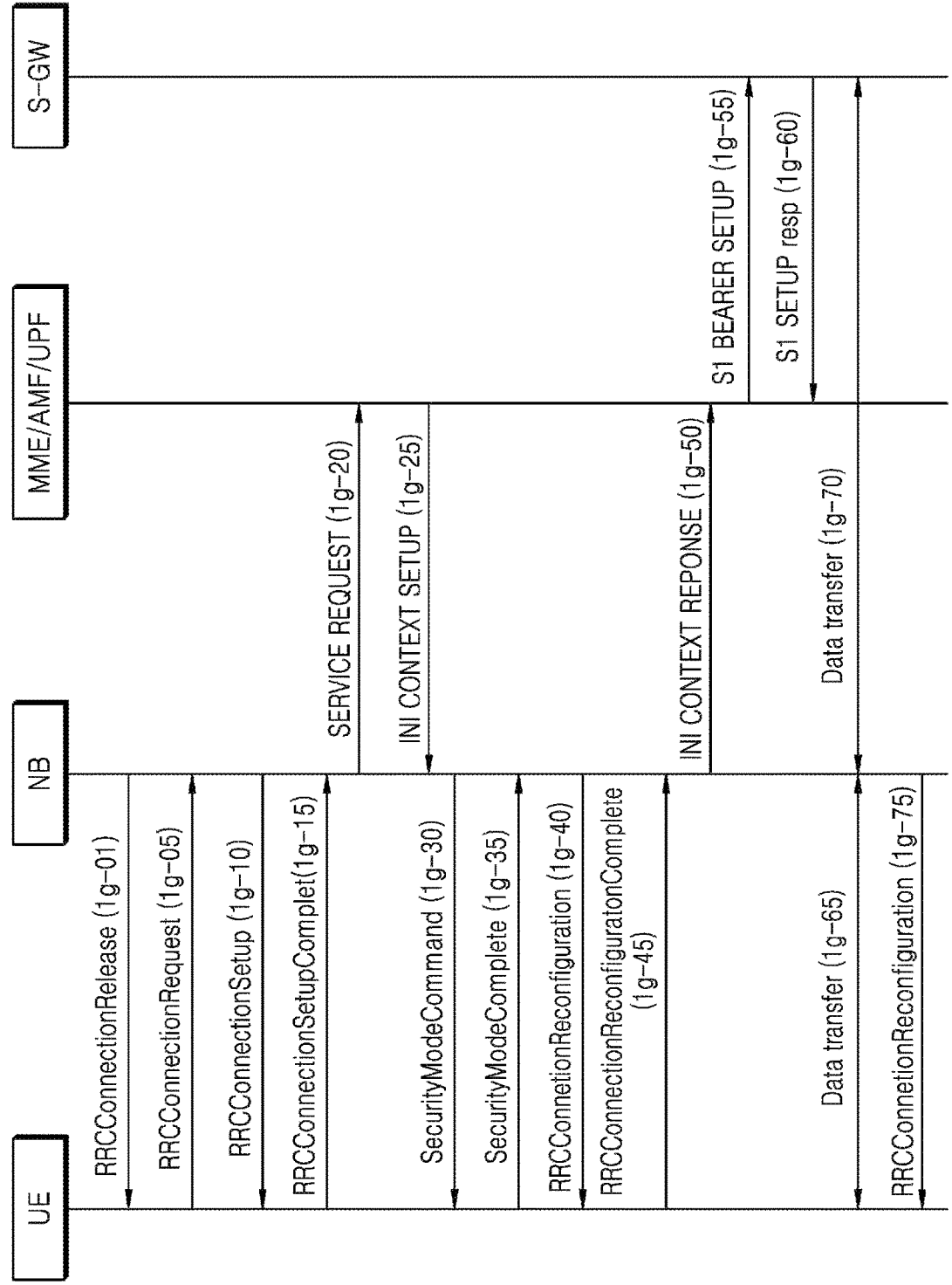
FIG. 1G is a diagram showing procedures of a next generation node B (gNB) establishing connection with a user equipment (UE) via a radio resource control (RRC) message when the UE establishes connection with a network, and setting a bearer of the UE or a PDCP entity, RLC entity, MAC entity, or physical (PHY) entity, according to an embodiment of the disclosure.

FIG. 1G is a diagram showing procedures of a gNB establishing connection with a UE via an RRC message when the UE establishes connection with a network, and setting a bearer of the UE or a PDCP entity, RLC entity, MAC entity, or PHY entity, according to an embodiment of the disclosure.

FIG. 1G illustrates procedures in which the UE establishes connection with the network by switching from an RRC idle mode or RRC inactive mode (or lightly-connected mode) to an RRC connected mode.

Referring to FIG. 1G, when the UE that transmits or receives data in the RRC connected mode does not transmit or receive data for a certain reason or for a certain time, the gNB transmits an RRCConnectionRelease message to the UE to switch to the RRC idle mode or RRC inactive mode (operation 1*g*-01). Thereafter, when data to be transmitted is generated or a paging message is received, the UE that has not currently established a connection (hereinafter, the idle mode UE) may perform an RRC connection establishment procedure with the gNB. When the UE is in the RRC inactive mode, the terminal may perform an RRC connection resume procedure by transmitting an RRCConnectionResumeRequest message. The UE may establish reverse transmission synchronization with the gNB through a random access procedure, and transmit a RRCConnectionRequest message to the gNB (operation 1*g*-05). The RRCConnectionRequest message may include an identifier of the UE, establishment cause, or the like.

The gNB may transmit an RRCConnectionSetup message such that the UE establishes RRC connection (operation 1*g*-10). Through the RRCConnectionSetup message, an UM, an AM, or a transport mode (TM) may be configured for each logical channel (logicalchannelconfig), bearer, PDCP entity (PDCT-config) or RLC entity, and window variables and timer values to be used in each PDCP entity or RLC entity, the length of a PDCP sequence number, the length of a RLC sequence number, etc. may be configured.

Also, the RRCConnectionSetup message may include RRC connection configuration information. The RRC connection may be referred to as an SRB and may be used in transmitting or receiving an RRC message that is a control message between the UE and the gNB. The UE that established the RRC connection may transmit a RRCConnetionSetupComplete message to the gNB (operation 1*g*-15).

The RRCConnetionSetupComplete message may include a control message such as a SERVICE REQUEST message for requesting an MME, access and mobility management function (AMF), user plane function (UPF), or session management function (SMF) to configure a bearer for a certain service by the UE. The gNB transmits the SERVICE REQUEST message included in the RRCConnetionSetupComplete message to the MME, AMF, UPF, or SMF (operation 1*g*-20), and the MME may determine whether to provide the service requested by the UE. As a result of the determination, when the service requested by the UE is to be provided, the MME, AMF, UPF, or SMF may transmit an INITIAL CONTEXT SETUP REQUEST message to the gNB (operation 1*g*-25). The INITIAL CONTEXT SETUP REQUEST message includes QoS information to be applied in configuring a DRB, security information (e.g., a security key, a security algorithm, or the like) to be applied to the DRB, or the like. The gNB exchanges a SecurityModeCommand message 1*g*-30 and a SecurityModeComplete message 1*g*-35 with the UE to configure a security mode. After the security mode is configured, the gNB may transmit a RRCConnectionReconfiguration message to the UE (operation 1*g*-40). Through the RRCConnectionReconfiguration message, a UM, AM, or TM may be configured for each logical channel (LogicalChannelConfig), bearer, PDCP entity (PDCP-config), or RLC entity, and window variables and timer values to be used in each PDCP entity or RLC entity, the length of a PDCP sequence number, the length of RLC, a serial number, or the like may be configured. Also, the RRCConnectionReconfiguration message includes setting information about the DRB to process user data, and the UE may set the DRB by using the setting information and transmit a RRCConnectionReconfigurationComplete message to the gNB (operation 1*g*-45). The gNB that completed the DRB setting with the UE may transmit an INITIAL CONTEXT SETUP COMPLETE message to the MME (operation 1*g*-50). Upon receiving the INITIAL CONTEXT SETUP COMPLETE message, the MME may exchange a S1 BEARER SETUP message 1*g*-55 and a S1 BEARER SETUP RESPONSE message 1*g*-60 with a S-GW so as to set a S1 bearer. The S1 bearer indicates data transmission connection that is set up between the S-GW and the gNB, and may correspond to the DRB in a one-to-one manner. After the above procedures are completed, the UE may transmit or receive data to or from the gNB through the S-GW in operations 1*g*-65 and 1*g*-70.

As such, general data transmission processes largely include three operations of RRC connection establishment, security setting, and DRB setting. Here, the gNB may transmit the RRCConnectionReconfiguration message in operation 1*g*-75 to newly apply, add, or change configurations of the UE for certain reasons.

Figure 1H:
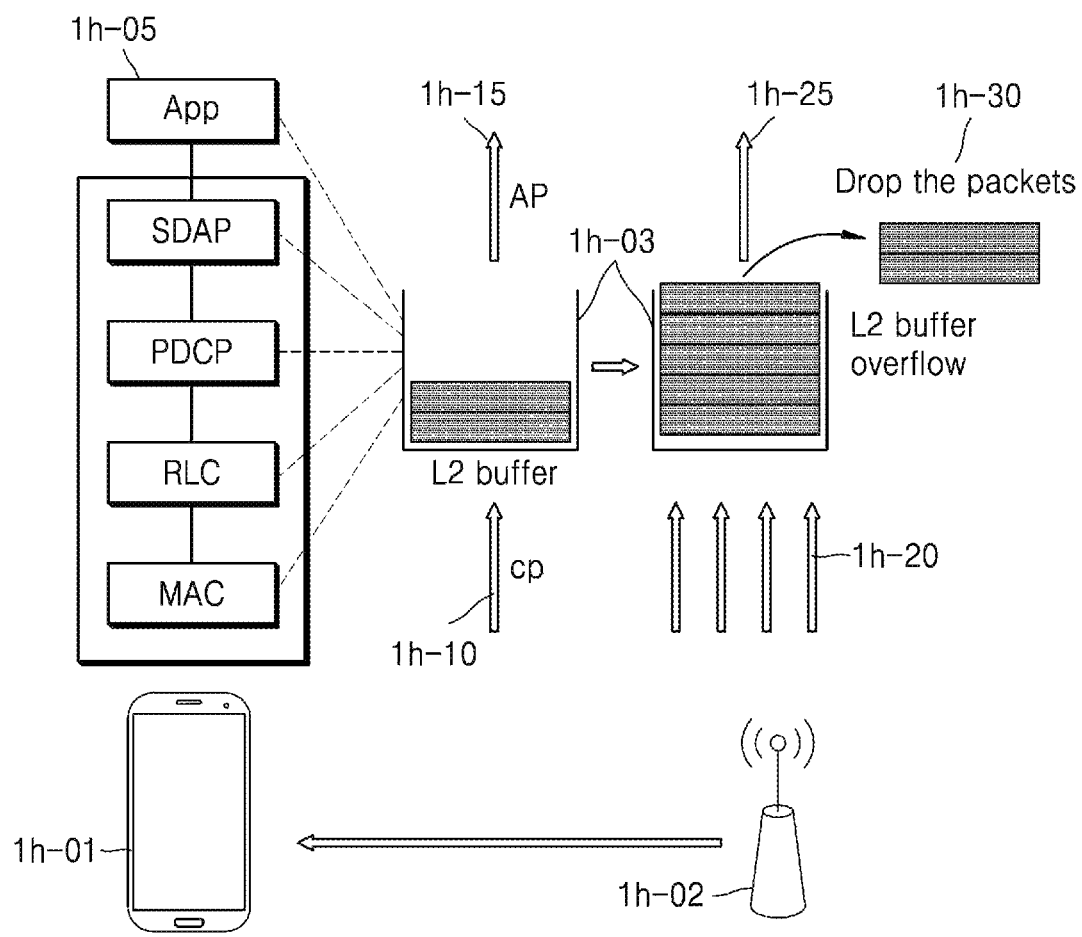
FIG. 1H is a diagram for describing a UE overflow issue that may occur in a next generation mobile communication system according to an embodiment of the disclosure.

FIG. 1H is a diagram for describing a UE overflow issue that may occur in a next generation mobile communication system according to an embodiment of the disclosure.

As described above with reference to FIGS. 1B, 1D, and 1F, each entity of a UE 1*h*-01 of FIG. 1H may process DL data received from a base station 1*h*-02. Referring to FIG. 1H, an overflow issue with respect to one bearer of the UE 1*h*-01 will be described.

A PHY entity, a MAC entity, an RLC entity, a PDCP entity, and an upper entity 1*h*-05 (for example, a transmission control protocol/Internet protocol (TCP/IP) entity, a user datagram protocol (UDP) entity, or the like) of the UE 1*h*-01 include a buffer 1*h*-03 storing data to process the data.

A plurality of entities may physically have different buffers or may share one physical buffer. Alternatively, the plurality of entities may share one physical buffer but the buffer may be logically divided according to entities.

Because the total amount of buffer space is finite, there may be a limit to UE capability in storing and processing data. For example, in FIG. 1H, a data processing speed of a communication processor (CP) 1h-10 and a data processing speed of an application processor (AP) 1h-15 of the UE 1h-01 may be balanced. However, the balance may be lost when a bottleneck phenomenon occurs at the CP 1h-10 or the AP 1h-15. For example, when the data processing speed of the CP 1h-10 is slower than that of the AP 1h-15 or when an amount of data received by a lower entity is much larger than a processing speed, an amount of data stored in the buffer 1h-03 may rapidly increase in operation 1h-20. Also, a timer may be triggered for a certain reason, for example, by data not yet received by the PDCP entity. Because data received while the timer is driven should be stored in the buffer 1h-03 without being processed by the AP 1h-15, the amount of data may rapidly increase. Thus, a buffer overflow may occur when the data rapidly increases for such reasons.

When the buffer overflow occurs, i.e., when there is no more buffer space to store received data, the UE 1h-01 may discard data in the upper entity in operation 1h-30. Accordingly, when a lossless service is to be supported, the upper entity (for example, TCP/IP entity) needs to transmit negative acknowledgment (NACK) to a base station upper entity with respect to lost data, based on a sequence number used in an upper entity. Accordingly, data indicating NACK may be transmitted via data processes of the PDCP entity, RLC entity, MAC entity, and PHY entity, and received via data processes of an PHY entity, MAC entity, RLC entity, PDCP entity, and upper entity of the base station 1h-02. An upper entity of a receiver (the base station 1h-02) may perform retransmission with respect to data in which NACK has occurred. Data that is retransmitted may be transmitted again via data processes of the PDCP entity, RLC entity, MAC entity, and PHY entity of the base station 1h-02, and received via data processes of the PHY entity, MAC entity, RLC entity, PDCP entity, and upper entity of the UE 1h-01. As described above, retransmission performed in an upper entity is not efficient and may cause a large transmission delay.

Figure 1I:
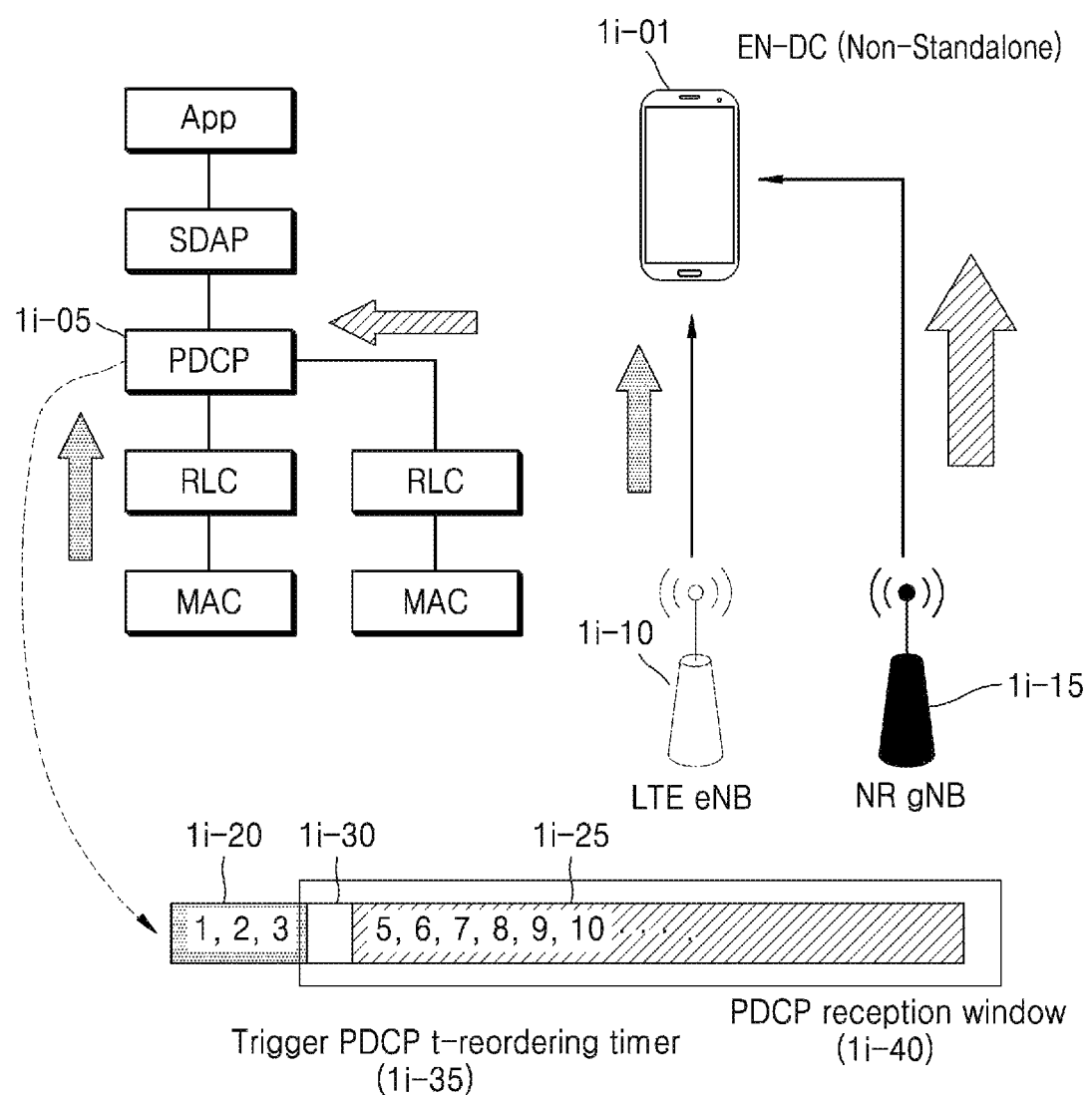
FIG. 1I is a diagram for describing another UE overflow issue that may occur in a next generation mobile communication system according to an embodiment of the disclosure.

FIG. 1I is a diagram for describing another UE overflow issue that may occur in a next generation mobile communication system according to an embodiment of the disclosure.

Referring to FIG. 1I, a UE 1i-01 may receive a service from an LTE eNB 1i-10 and an NR gNB 1i-15 via DC. Thus, the UE 1i-01 may receive data from an LTE eNB 1i-10 and the NR gNB 1i-15 via a split bearer 1i-05 according to DC. The LTE eNB 1i-10 may support a data transmission rate up to about 1 Gbps, and the NR gNB 1i-15 may support a data transmission rate of up to about 20 Gbps. Accordingly, a difference in data transmission rates received from each of the LTE eNB 1i-10 and the NR gNB 1i-15 may be greatly increased.

A PDCP entity of the split bearer 1i-05 set in the UE 1i-01 is connected to two RLC entities, and the RLC entities may process data received respectively from the LTE eNB 1i-10 and the NR gNB 1i-15 and transmit the processed data to the PDCP entity. The PDCP entity may receive data from the two different RLC entities. The PDCP entity may arrange an order of the data based on PDCP sequence numbers included in a PDCP header of the received data, and transmit the data to an upper entity in the order.

When a sequence number on the order is not matched while arranging the order of data based on the PDCP sequence number, for example, when the PDCP sequence numbers of the received data are 1, 2, 3, 5, 6, 7, 8, 9, and 10 and data corresponding to the PDCP sequence number of 4 is not received yet, the PDCP entity may trigger a PDCP t-reordering timer (1i-35) in operation 1i35, and stand by until the data corresponding to the PDCP sequence number of 4 is received while the PDCP t-reordering timer (1i-35) is driven. In other words, the pieces of data received while the t-reordering timer is driven are all stored in a buffer, and because the order of pieces of data having the PDCP sequence numbers larger than 4 is not arranged, the data is unable to be transmitted to the upper entity. Accordingly, when the PDCP sequence numbers of the pieces of data received from the LTE eNB 1i-10 as indicated by reference numeral 1i-20 of FIG. 1I and the pieces of data received from the NR gNB 1i-15 as indicated by reference numeral 1i-25 are arranged in an order, but data 1i-30 in the middle is not yet received, the PDCP t-reordering timer (1i-35) is triggered, and while the PDCP t-reordering timer (1i-35) is triggered, all pieces of data need to be stored in the buffer despite the data being supposed to be receivable at a high data transmission rate as in the NR gNB 1i-15 as indicated by the reference numeral 1i-25. Also, a PDCP reception window (1i-40) is no longer movable.

When it is assumed that a value of the PDCP t-reordering timer (1i-35) is set to 3 seconds and the NR gNB 1i-15 supports a service with a maximum transmission rate of 20 Gbps, a buffer size of 3 seconds×20 Gbps/8 bits=7.5 Gbytes may be required. In other words, when the buffer size of the UE 1i-01 is smaller than 7.5 Gbytes or a remaining capacity of the buffer size is smaller than 7.5 Gbytes, a buffer overflow may frequently occur in the example described above. Also, because the buffer includes an expensive memory, such as a dynamic random access memory (DRAM), the buffer is closely related to the price of the UE 1i-01. Accordingly, a method for efficiently resolving a buffer overflow is required.

According to a method of detecting the buffer overflow according to an embodiment of the disclosure, it may be determined that the buffer overflow is expected or occurs when one or more conditions are satisfied among the following conditions. Also, according to an embodiment of the disclosure, when the buffer overflow occurs, the PDCP entity, RLC entity, MAC entity, or PHY entity may be notified about the buffer overflow by transmitting an indication of occurrence of the buffer overflow thereto. Also, according to an embodiment of the disclosure, when the buffer overflow is resolved, the PDCP entity, RLC entity, MAC entity, or PHY entity may be notified about the resolution of the buffer overflow by transmitting an indication of the resolution of the buffer overflow thereto the PDCP entity, RLC entity, MAC entity, or PHY entity.

According to an embodiment of the disclosure, one or more conditions for determining that buffer overflow is expected or occurs are as follows.

1. When a remaining capacity of a buffer is smaller than a certain threshold value 2. When a total capacity of data stored in a buffer is greater than a certain threshold value 3. When data equal to a total capacity of a buffer is stored 4. When buffer overflow is expected in consideration of a current data receiving rate and a remaining capacity of a buffer 5. When buffer overflow is expected within a certain time in consideration of a current data receiving rate and a remaining capacity of a buffer Also, one or more conditions for determining that a buffer overflow is resolved are as follows.

1. When a remaining capacity in a buffer is greater than a certain threshold value
2. When a total capacity of data stored in a buffer is smaller than a certain threshold value
3. When data smaller than a total capacity of a buffer is stored
4. When resolution of buffer overflow is expected in consideration of a current data receiving rate and a remaining capacity of a buffer
5. When resolution of buffer overflow is expected within a certain time in consideration of a current data receiving rate and a remaining capacity of a buffer As described above, when a buffer overflow occurs, i.e., when there is no more buffer space to store received data, the UE 1i-01 starts to discard the data from the upper entity. Thus, when a lossless service is to be supported, the upper entity (for example, a TCP/IP entity) needs to transmit a NACK to a base station upper entity with respect to lost data, based on a sequence number used in the upper entity. Thus, data indicating NACK may be transmitted via data processes of the PDCP entity, RLC entity, MAC entity, and PHY entity, and received via data processes of the PHY entity, MAC entity, RLC entity, PDCP entity, and the upper entity of the base station. In this case, the upper entity of a receiver (the base station) may retransmit the data with NACK. The retransmitted data may be again transmitted via data processes of the PDCP entity, RLC entity, MAC entity, and PHY entity of the base station, and may be received via data processes of the PHY entity, MAC entity, RLC entity, PDCP entity, and upper entity of the UE 1i-01. As described above, retransmission performed by the upper entity is very inefficient, and causes high transmission delay.

When the data is discarded from the upper entity due to the buffer overflow, the retransmission of the upper entity is triggered and thus the high transmission delay may result. In particular, because a transmitter (the base station) does not know whether an issue, such as buffer overflow, occurs in a receiver (the UE 1i-01), the transmitter continuously transmits data and thus transmission resources are continuously wasted.

The above embodiments of the disclosure propose methods for reducing transmission delay by a lower entity deleting data and requesting retransmission, when the buffer overflow is detected based on the above conditions. Here, the lower entity may be the PHY entity, MAC entity, RLC entity, or PDCP entity.

According to a first embodiment of the disclosure, when the buffer overflow is detected according to the above conditions, the PHY entity may request the base station to suspend data transmission. In other words, when the buffer overflow is detected, the UE 1i-01 may transmit an indication of occurrence of the buffer overflow to the PHY entity. Upon receiving the indication of occurrence of the buffer overflow, the PHY entity may indicate a certain value of a pre-determined channel quality indicator (CQI) table when reporting CQI to the base station via L1 signaling. The certain value (for example, index 0) of the CQI table may indicate not to transmit DL data anymore for certain reasons, such as a poor current channel state when the UE 1i-01 measures CQI. In other words, the PHY entity of the UE 1i-01 may indicate to the base station that the DL data is not receivable via L1 signaling.

When it is determined that the buffer overflow is resolved, the UE 1i-01 may transmit an indication of resolution of the buffer overflow to the PHY entity. Upon receiving the indication of the resolution of the buffer overflow, the PHY entity may report, to the base station, a certain value (for example, an index corresponding to the measured CQI value other than index 0) indicating that DL data transmission is requestable again from the CQI table, via L1 signaling based on the measured CQI value. Accordingly, the base station may resume the DL data transmission again.

Thus, according to the first embodiment of the disclosure, the base station may be requested to suspend data transmission until the buffer overflow is resolved, thereby preventing unnecessary waste of transmission resources.

According to a second embodiment of the disclosure, when the buffer overflow is detected by the above conditions, the MAC entity may discard the data. In other words, when the buffer overflow is detected, the UE 1i-01 may transmit the indication of occurrence of the buffer overflow to the MAC entity. Upon receiving the indication of occurrence of the buffer overflow, the MAC entity immediately starts to discard all pieces of data (for example, MAC PDU) received thereafter. Also, the MAC entity may transmit NACK indicating that all pieces of data after the indication of occurrence of the buffer overflow is received are not successfully received, to the base station. The MAC entity may perform the above procedure until an indication of resolution of the buffer overflow is received.

When it is determined that the buffer overflow is resolved, the UE 1i-01 may transmit an indication of resolution of the buffer overflow to the MAC entity. Upon receiving the indication of resolution of the buffer overflow, the MAC entity may suspend deleting the received data, inverse-multiplex data received thereafter to normal data, and transmit the normal data to the upper entities.

Thus, according to the second embodiment of the disclosure, until the buffer overflow is resolved, the MAC entity discards the data received from the base station and transmits NACK indicating unsuccessful transmission to the base station such that the base station continuously performs retransmission or performs new transmission. In this case, transmission resources may be wasted, but the upper entity (for example, the TCP/IP entity) may be prevented from performing inefficient retransmission. Also, when the buffer overflow is resolved, the transmission delay may be reduced because pieces of data discarded by the MAC entity are retransmitted by the MAC entity or RLC entity instead of being inefficiently retransmitted by the upper entity (for example, the TCP/IP entity) that may cause high transmission delay.

Figure 1J:
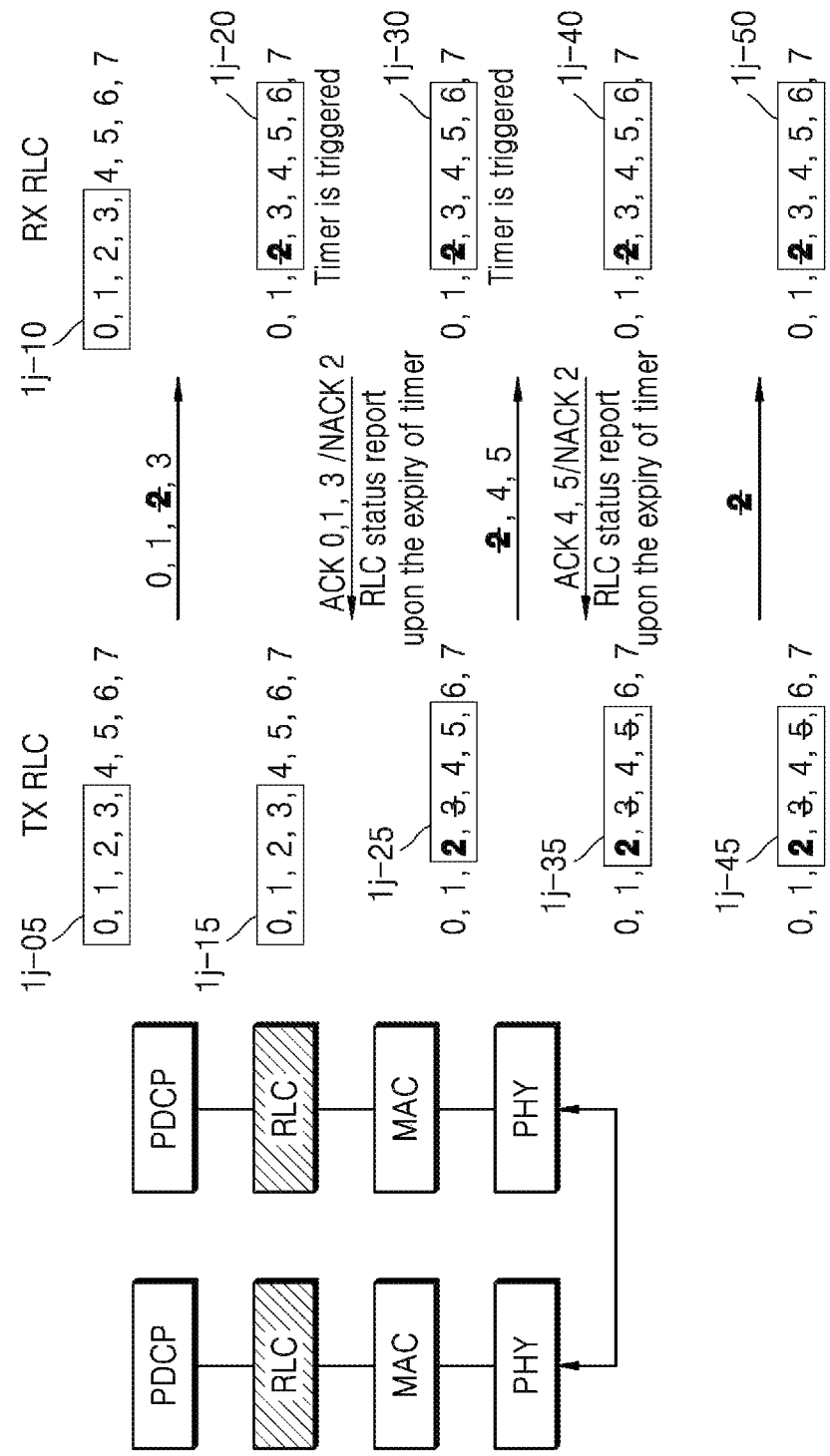
FIG. 1J is a diagram for describing a basic operation of an acknowledged mode (AM) RLC entity according to a third embodiment of the disclosure.

FIG. 1J is a diagram for describing a basic operation of an AM RLC entity according to a third embodiment of the disclosure.

The AM RLC entity may be classified into a transmission RLC entity and a reception RLC entity. The transmission RLC entity and the reception RLC entity may respectively drive a transmission RLC window and a reception RLC window, and manage transmission window variables, reception window variables, and various types of timers (for example, t-reassembly timer, t-reordering timer, polling timer, etc.). Also, the transmission RLC window and the reception RLC window may be updated and moved based on RLC sequence numbers.

For convenience of description, when an RLC sequence number having a length of 3 bits is used, the RLC sequence number may be from 0 to 7, and the transmission RLC window and the reception RLC window may have a size of 2^(3−1)=4 that is half of an RLC sequence number space. First, the transmission RLC entity may perform operation 1*j*-05 by transmitting to a receiver by assigning RLC sequence numbers to pieces of generated data in an order of 0, 1, 2, 3, 4, 5, 6, and 7 and constituting data. The transmission RLC window of the transmission RLC entity may receive an RLC status report (RLC status PDU) from the reception RLC entity and move only according to RLC sequence numbers whose successful transmission (ACK) is confirmed in an order. In other words, when the successful transmission is not confirmed in the RLC status report, the transmission RLC window is unable to move. Also, the transmission RLC entity may perform retransmission whenever the RLC status report is received. Also, the transmission RLC entity may perform transmission or retransmission only on data in the transmission RLC window.

When the transmission RLC entity transmits pieces of data corresponding to the RLC sequence numbers 0, 1, 2, and 3 (operation 1*j*-05), but the data corresponding to the RLC sequence number 2 is lost during the transmission and the reception RLC entity receives only the pieces of data corresponding to the RLC sequence numbers 0, 1, and 3 (operation 1*j*-10), because the data corresponding to the RLC sequence number 2 is suspected to be lost, a timer may be triggered to determine how long to wait for the data. Upon expiry of the timer, the reception RLC entity may constitute an RLC status report indicating that the pieces of data corresponding to the RLC sequence numbers 0, 1, and 3 are successfully received (ACK) and the data corresponding to the RLC sequence number 2 is not successfully received (NACK), and transmit the RLC status report to the transmission RLC entity (operations 1*j*-15 and 1*j*-20). Upon receiving the RLC status report, because it is confirmed that the pieces of data corresponding to the RLC sequence number 0 and 1 are successfully received, the transmission RLC entity may move a lower edge of the reception RLC window to 2 (operation 1*j*-25). Also, the transmission RLC entity may retransmit the data corresponding to the RLC sequence number 2, and transmit the pieces of data corresponding to the RLC sequence numbers 4 and 5. When the pieces of data corresponding to the RLC sequence numbers 4 and 5 are successfully received but the data corresponding to the RLC sequence number 2 is lost again, the timer may be triggered to determine how long to wait for the data (1*j*-30). Upon expiry of the timer, an RLC status report is triggered and compiled for a certain reason, and the reception RLC entity may indicate the transmission RLC that the pieces of data corresponding to the RLC sequence numbers 4 and 5 are successfully received and the data corresponding to the RLC sequence number 2 is lost (operations 1*j*-35 and 1*j*-40). One or more reasons for triggering the RLC status report includes expiry of a t-reordering timer or t-reassembly timer of the RLC entity, transmission of at least a certain number of RLC hierarchical data (RLC PDU or RLC SDU), transmission of at least a certain amount of RLC hierarchical data (RLC PDU or RLC SDU), or reception of data where a poll bit is set in an RLC header.

As described above, the transmission RLC entity may move the transmission RLC window only by the RLC status report, and transmittable data may be limited to data in the transmission RLC window. Also, the transmission RLC entity may receive the RLC status report and retransmit data whose NACK is received (operations 1*j*-45 and 1*j*-50).

In the third embodiment of the disclosure, when the buffer overflow is detected via the above conditions, the AM RLC entity may control a data receiving rate according to bearers.

Figure 1K:
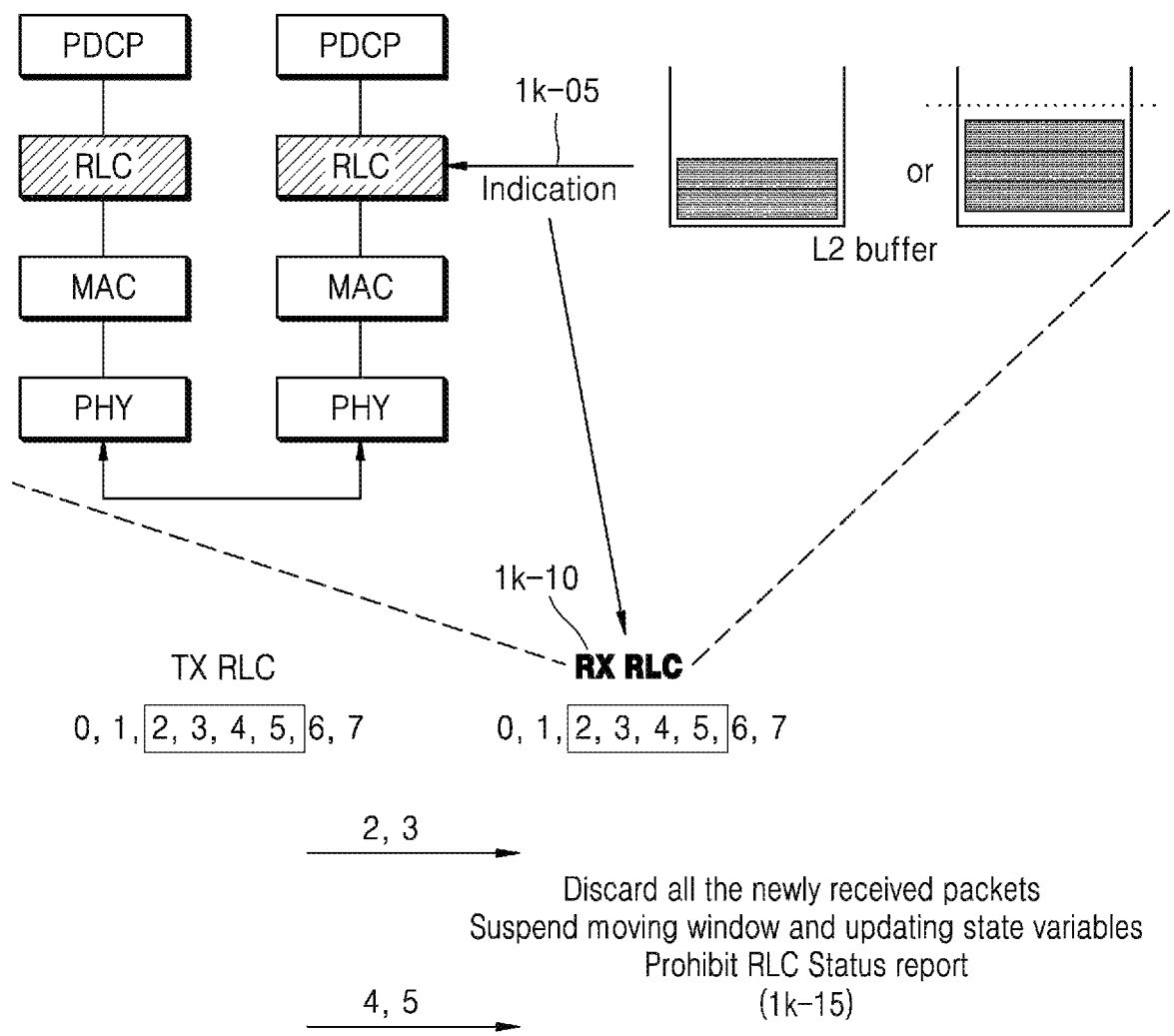
FIGS. 1K and 1L are diagrams according to the third embodiment of the disclosure.

FIG. 1K is a diagram according to the third embodiment of the disclosure.

Referring to FIG. 1K, when a buffer overflow is detected, a UE may transmit an indication of occurrence of the buffer overflow to an RLC entity (operation 1*k*-05). Upon receiving the indication of occurrence of the buffer overflow, a reception RLC entity starts to immediately discard all pieces of data (for example, RLC PDU) received thereafter. Also, the reception RLC entity 1*k*-10 no longer updates reception window variables, and may not move a reception window. Also, the reception RLC entity 1*k*-10 may not generate an RLC status report. The reception RLC entity 1*k*-10 may not generate and transmit the RLC status report even when polling in which the RLC status report is triggered is performed in a transmission RLC entity. In other words, the reception RLC entity 1*k*-10 may immediately discard received data and may not trigger the RLC status report (operation 1*k*-15) even when a poll bit is set in an RLC header of the received data. Also, the reception RLC entity 1*k*-10 may not drive a t-reordering or t-reassembly timer. When a timer is being already driven, the reception RLC entity 1*k*-10 may reset and initialize the timer. The reception RLC entity 1*k*-10 may not trigger the RLC status report even when the timer expires. The above procedures may be performed until the reception RLC entity 1*k*-10 of the UE receives an indication of resolution of the buffer overflow.

In the third embodiment of the disclosure, when the buffer overflow is detected, the reception RLC entity 1*k*-10 of the UE may discard all pieces of data received thereafter, suspend moving the reception RLC window and updating the window variables, suspend and initialize the timer, and not transmit the RLC status report. When the reception RLC entity 1*k*-10 does not transmit the RLC status report, a transmission RLC entity of a base station performs transmission only on data in a transmission RLC window, and is unable to transmit more data. This is because the transmission RLC entity moves the transmission RLC window based on the RLC status report and continuously transmits data. Thus, when the RLC status report is not continuously received, the transmission RLC entity of the base station is unable to perform continuous data transmission, but only performs polling of requesting the RLC status report periodically or whenever a polling timer expires. Accordingly, in terms of the UE, a data receiving rate may be remarkably decreased only with respect to an AM RLC entity among a plurality of bearers. Also, in terms of the base station, only the AM RLC entity among the plurality of bearers may temporarily suspend data transmission and stand by until the RLC status report is received.

Thus, according to an embodiment of the disclosure, unnecessary retransmission of data to be discarded due to the buffer overflow is not required to be performed, and the AM RLC entity of the UE is capable of adjusting a data receiving rate, and thus transmission resources may be prevented from being wasted until the buffer overflow is resolved.

Figure 1L:
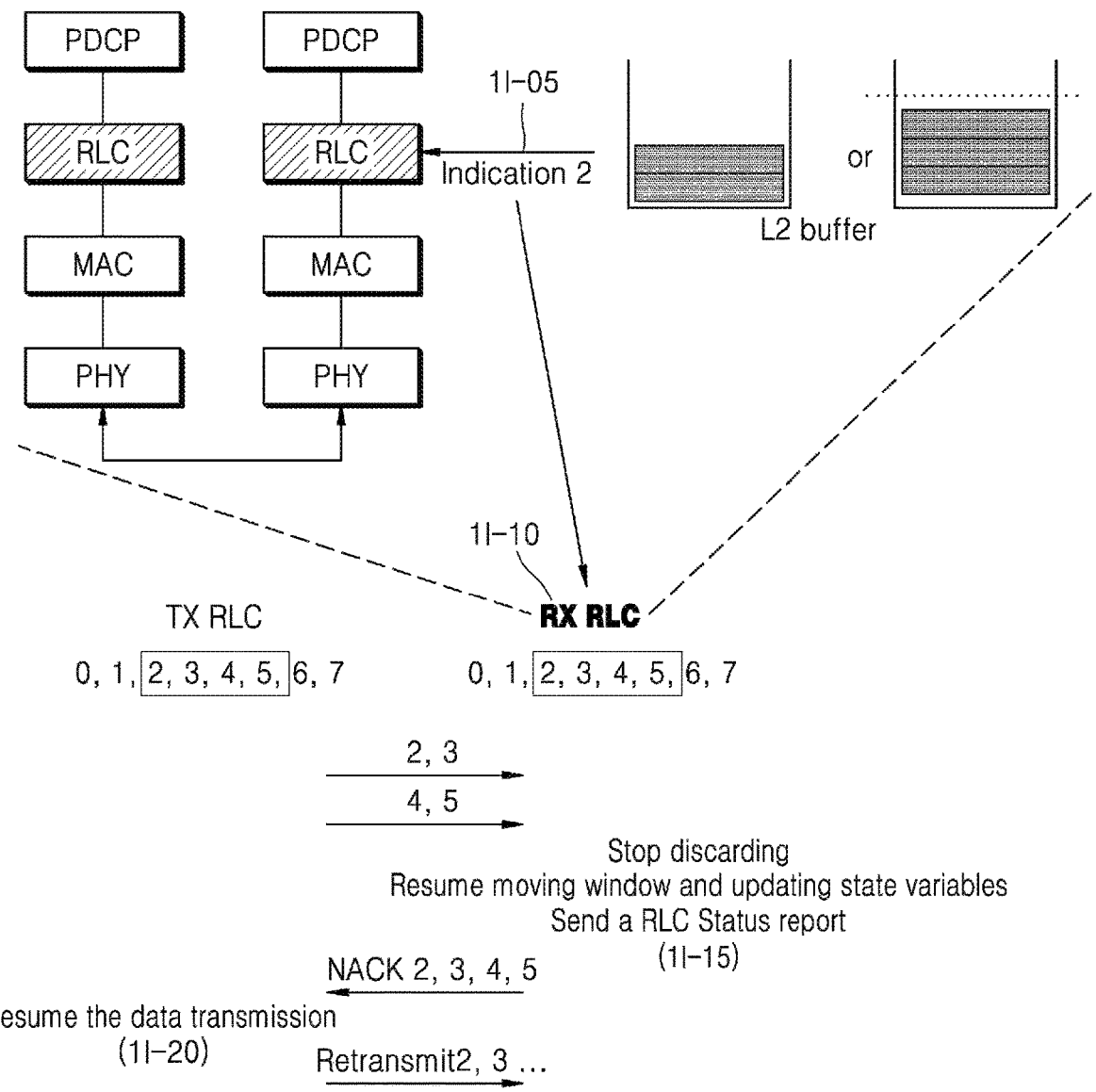

FIG. 1L is a diagram according to the third embodiment of the disclosure.

Referring to FIG. 1L, when the buffer overflow is resolved, the UE may indicate an indication (Indication 2) of resolution of the buffer overflow to the AM RLC entity (operation 1*l*-05). Upon receiving the indication of resolution of the buffer overflow, a reception RLC entity 1*l*-10 may no longer discard data (for example, RLC PDU) received thereafter and normally receive and process data. Also, the reception RLC entity 1*l*-10 may compile the RLC status report about successful transmission of RLC sequence numbers in consideration of window variables based on RLC PDU currently received and data (RLC PDU or RLC SDU) stored in a current buffer, and transmit the RLC status report to the transmission RLC entity (operation 1*l*-15).

Upon receiving the RLC status report, the transmission RLC entity of the base station may move a window by RLC sequence numbers successfully transmitted in an order based on RLC sequence numbers indicated to be successfully received (ACK), and start new data transmission (operation 1*l*-15). Also, the transmission RLC entity of the base station may retransmit RLC sequence numbers that are indicated to be not received successfully (NACK) in the RLC status report (operation 1*l*-15). Accordingly, when the buffer overflow is resolved, the upper entity (for example, a TCP/IP entity) does not perform retransmission, but the transmission RLC entity performs retransmission (operation 1*l*-20) on the data discarded due to the buffer overflow or lost by the reception RLC entity 1*l*-10, thereby reducing a transmission delay.

In other words, in the third embodiment of the disclosure, according to the detecting and resolving of the buffer overflow of the UE, the RLC entity of the UE operating in AM according to bearers may discard received data and adjust transmission of the RLC status report, thereby adjusting a transmission rate of data transmitted by the transmission RLC entity of the base station according to bearers.

In the third embodiment of the disclosure, until the buffer overflow is resolved, the reception RLC entity 1*l*-10 of the UE (receiver) may not transmit the RLC status report to the transmission RLC entity of the base station (transmitter).

Meanwhile, in a 3-1 embodiment of the disclosure, even when the buffer overflow is not resolved, a reception RLC entity of a UE (receiver) may transmit an RLC status report to a transmission RLC entity of a base station (transmitter) intermittently or by delaying transmission.

When the reception RLC entity of the UE (receiver) does not continuously transmit the RLC status report (RLC Status PDU), the transmission RLC entity of the base station (transmitter) may perform retransmission on data whose successful transmission is not confirmed among transmitted data by setting a poll bit to 1, after transmitting all pieces of data in a transmission window. Also, the transmission RLC entity may drive a t-pollretransmit timer, and when the t-pollretransmit timer expires, perform retransmission again by setting a poll bit with respect to the data. Also, the transmission RLC entity repeats the above operations, and when the maximum retransmission number is exceeded while repeating the operations, disconnects a connection between the UE and the base station and reconnects the UE and the base station.

Accordingly, in the 3-1 embodiment of the disclosure, as described above, in order to prevent the base station from disconnecting from the UE, the RLC status report may be transmitted intermittently or after being delayed.

In the 3-1 embodiment of the disclosure, a method, performed by the reception RLC entity of the UE (receiver), of transmitting the RLC status report is as follows.

First Method: When a buffer overflow is detected, a UE notifies a reception RLC entity of the UE about the buffer overflow, and the reception RLC entity may discard all pieces of data (for example, RLC PDU) received thereafter. Then, the reception RLC entity may transmit an RLC status report about the discarded data to a base station (transmitter) RLC entity whenever the RLC status report is triggered via polling. The reception RLC entity reports the RLC status report only when triggered via polling, thereby delaying a phenomenon in which a base station cuts connection with the UE.

Second Method: When a buffer overflow is detected, a UE notifies a reception RLC entity of the UE about the buffer overflow, and the reception RLC entity may discard all pieces of data (for example RLC PDU) received thereafter. However, when discarding data, the reception RLC entity may store all RLC sequence numbers. In other words, upon receiving pieces of data corresponding to RLC sequence numbers 0 through 7 from a base station (transmitter), the reception RLC entity may store the RLC sequence numbers and discard the pieces of data of the stored RLC sequence numbers. The stored RLC sequence numbers may be used by the UE to measure a range of data transmittable by a transmission RLC entity of the base station (transmitter) in a transmission window. In other words, even when an RLC status report is not transmitted from the reception RLC entity of the UE, the transmission RLC entity may continuously transmit the data in the transmission window. Then, when pieces of data in the transmission RLC window of the transmission RLC entity are all transmitted and data is no longer transmittable, a poll bit of 1 is set to one piece of data whose successful transmission is not confirmed among the pieces of data that have been transmitted and polling is performed to request the reception RLC entity of the UE for an RLC status report. Accordingly, data whose RLC sequence number is already received but is overlapping is received again while the reception RLC entity of the UE is checking the received RLC sequence numbers, and when a poll bit is set to an RLC header having the overlapping RLC sequence number, the RLC status report may be triggered from that moment and transmitted to the transmission RLC entity of the base station. In other words, while checking the received RLC sequence numbers, the reception RLC entity of the UE may again receive the data whose RLC sequence number is already received but is overlapping and may not transmit the RLC status report until a poll bit is set to an RLC header having the overlapping RLC sequence number. Accordingly, the RLC entity of the UE may delay data retransmission number of the transmission RLC entity of the base station from increasing. In other words, the RLC status report of the reception RLC entity may be delayed until a transmission window of the transmission RLC entity is stopped (stalled). The reception RLC entity of the UE may transmit the RLC status report about discarded data to the transmission RLC entity of the base station (transmitter) whenever the RLC status report is triggered via polling. The reception RLC entity of the UE transmits the RLC status report whenever triggered via polling, thereby delaying a phenomenon in which the base station cuts connection with the UE.

Third Method: When a buffer overflow is detected, a UE notifies a reception RLC entity of the UE about the buffer overflow, and the reception RLC entity may discard all pieces of data (for example, RLC PDU) received thereafter. However, when discarding data, the reception RLC entity may store all RLC sequence numbers. In other words, upon receiving pieces of data corresponding to RLC sequence numbers 0 through 7 from a base station (transmitter), the reception RLC entity may store the RLC sequence numbers and discard the pieces of data of the stored RLC sequence numbers. The stored RLC sequence numbers may be used by the UE to measure a range of data transmittable by a transmission RLC entity of the base station (transmitter) in a transmission window. In other words, even when an RLC status report is not transmitted from the reception RLC entity of the UE, the transmission RLC entity may continuously transmit the data in the transmission window. Then, when pieces of data in the transmission RLC window of the transmission RLC entity are all transmitted and data is no longer transmittable, a poll bit of 1 is set to one piece of data whose successful transmission is not confirmed among the pieces of data that have been transmitted and polling is performed to request the reception RLC entity of the UE for an RLC status report. Accordingly, data whose RLC sequence number is already received but is overlapping is received again while the reception RLC entity of the UE is checking the received RLC sequence numbers, and when a poll bit is set to an RLC header having the overlapping RLC sequence number, the RLC status report may be triggered from that moment and transmitted to the transmission RLC entity of the base station. In other words, while checking the received RLC sequence numbers, the reception RLC entity of the UE may again receive the data whose RLC sequence number is already received but is overlapping and may not transmit the RLC status report until a poll bit is set to an RLC header having the overlapping RLC sequence number. Accordingly, the RLC entity of the UE may delay increasing the data retransmission number of the transmission RLC entity of the base station. In other words, the RLC status report of the reception RLC entity may be delayed until a transmission window of the transmission RLC entity is stopped (stalled). Unlike the second method, in the third method, when a poll bit is set to data redundantly received once while checking the RLC sequence numbers, the reception RLC entity of the UE may transmit a first RLC status report. Also, second and n-th RLC status reports may be transmitted according to the following conditions. When redundant data is received again with respect to data that is redundantly received once while checking the RLC sequence numbers and a poll bit is set, it may be determined that the first RLC status report transmitted by the UE is lost and the UE may retransmit the first RLC status report. In other words, when data is continuously redundantly received two times or same data is redundantly received three times or n times while a poll bit is set, the UE may determine that a transmitted RLC status report is lost and retransmit the first RLC status report.

An RLC status report may include data (ACK) successfully received by the reception RLC entity of the UE before a buffer overflow is detected and data (NACK) discarded thereafter. Then, the transmission RLC entity of the base station may retransmit data in the transmission window based on the received RLC status report.

The reception RLC entity of the UE may check RLC sequence numbers received again and discard data until the buffer overflow is resolved. RLC sequence numbers redundantly received two times while checking the RLC sequence numbers are retransmitted by the base station based on the RLC status report with respect to the data in the transmission window. However, when a poll bit is set to an RLC header of the RLC sequence numbers that are redundantly received at least three times, it may be determined that the base station performed polling by setting the poll bit to retransmitted data because all pieces of data in the transmission window are retransmitted and there is no more data to be transmitted. Accordingly, when the poll bit is set to the RLC header of the RLC sequence numbers redundantly received at least three times as above, the UE may trigger a second RLC status report and transmit the second RLC status report to the base station. When redundant data is received again with respect to the data redundantly received three times while checking the RLC sequence numbers and a poll bit is set, the UE may determine that the second RLC status report is lost and retransmit the second RLC status report.

In other words, when data is redundantly received continuously or same data is redundantly received n times while a poll bit is set, the UE may determine that a transmitted RLC status report is lost and retransmit the second RLC status report. An RLC status report may include data (ACK) successfully received by the reception RLC entity of the UE before the buffer overflow is detected and data (NACK) discarded thereafter. Then, the transmission RLC entity of the base station performs retransmission again with respect to data in the transmission window based on the received RLC status report. By repeating the above method, a phenomenon in which the base station cuts connection with the UE may be delayed for a very long time.

In the 3-1 embodiment of the disclosure described above, the third method in which transmission of an RLC status report is delayed may prevent disconnection between the base station and the UE due to continuous retransmission of data corresponding to one RLC sequence number by the base station and a rapid increase of the maximum retransmission number. Also, in the third method of the 3-1 embodiment of the disclosure, the base station may retransmit all pieces of data indicated to be NACK again based on the RLC status report and increase a retransmitted number of the retransmitted data. In the third method of the 3-1 embodiment of the disclosure, the RLC status report is transmitted again such that the base station repeats procedures of retransmitting all pieces of data indicated to be NACK again based on the RLC status report and increasing a retransmission number of each piece of retransmitted data. Accordingly, a time of increasing a retransmission time of each piece of RLC data (RLC PDU) may be delayed. Through such procedures, transmission resources of the base station transmitting data may be wasted, but time may be saved until the buffer overflow that occurred in the UE is resolved and inefficient retransmission in an upper entity (for example, TCP/IP entity) may be prevented. Also, through such procedures, retransmission of data discarded in the RLC entity may be performed by indicating NACK via the RLC status report when the buffer overflow is resolved, and thus there may be no lost data.

When the length of RLC sequence number is 3 bits (0~2^3−1), 1 piece of data is transmittable for one unit time, a polling retransmission timer value is 2 times a unit time, and the maximum retransmission number is 5, the third method may increase the retransmission number and delay a disconnection time as long as possible as follows. In other words, according to the third method, a long time may be taken to wait until the buffer overflow is resolved. Here, the size of the transmission window is 4, which is half of the RLC sequence numbers. Referring to the table below, the reception RLC entity of the UE may check the RLC sequence numbers as follows.

|        | 0                  | 1                              | 2                              | 3                                 | 4 | 5 | 6 | 7 |
|--------|--------------------|--------------------------------|--------------------------------|-----------------------------------|---|---|---|---|
| Time 0 | Received one time  |                                |                                |                                   |   |   |   |   |
| Time 1 (overflow occurred) | Received one time | Received one time Discard |                  |                                   |   |   |   |   |
| Time 2 |                    |                                | Received one time Discard      |                                   |   |   |   |   |
| Time 3 Stall transmission window |     |                                |                                | Received one time Discard         |   |   |   |   |
| Time 4 Polling Transmit RLC status report |  |                        |                                | Received two times Discard        |   |   |   |   |
| Time 5 |                    | Received two times Discard     |                                |                                   |   |   |   |   |
| Time 6 |                    |                                | Received two times Discard     |                                   |   |   |   |   |
| Time 7 |                    |                                |                                | Received three times Discard      |   |   |   |   |
| Time 8 Polling Transmit RLC status report |  |                        |                                | Received four times Discard       |   |   |   |   |
| Time 9 |                    | Received three times Discard   |                                |                                   |   |   |   |   |
| Time 10 |                   |                                | Received three times Discard   |                                   |   |   |   |   |
| Time 11 |                   |                                |                                | Received four times Discard       |   |   |   |   |
| Time 12 Polling Transmit RLC status report | |                      |                                | Received five times Discard       |   |   |   |   |
| Time 13 |                   | Received four times Discard    |                                |                                   |   |   |   |   |
| Time 14 |                   |                                | Received four times Discard    |                                   |   |   |   |   |
| Time 15 |                   |                                |                                | Received five times Discard       |   |   |   |   |
| Time 16 Base station attempts to disconnect due to excess of maximum retransmission number |  |  |                  |                                   |   |   |   |   |

In normal cases, i.e., when the polling frequently occurs and the RLC status report is frequently transmitted, one or a small number of pieces of RLC data is continuously retransmitted as in the table below and the retransmission number is rapidly increased, and thus connection may be cut quickly.

|        | 0                 | 1             | 2                 | 3 | 4 | 5 | 6 | 7 |
|--------|-------------------|---------------|-------------------|---|---|---|---|---|
| Time 0 | Received one time |               |                   |   |   |   |   |   |
| Time 1 | Received one time | Lost one time |                   |   |   |   |   |   |
| Time 2 |                   |               | Received one time |   |   |   |   |   |

|        | 0 | 1 | 2 | 3 | 4 | 5 | 6 | 7 |
|---|---|---|---|---|---|---|---|---|
| Time 3 |   |   |   | Received one time |   |   |   |   |
| Transmit RLC status report |   |   |   |   |   |   |   |   |
| Time 4 |   | Lost two times |   |   |   |   |   |   |
| Transmit RLC status report |   |   |   |   |   |   |   |   |
| Time 5 |   | Lost three times |   |   |   |   |   |   |
| Transmit RLC status report |   |   |   |   |   |   |   |   |
| Time 6 |   | Lost four times |   |   |   |   |   |   |
| Transmit RLC status report |   |   |   |   |   |   |   |   |
| Time 7 |   | Lost five times |   |   |   |   |   |   |
| Transmit RLC status report |   |   |   |   |   |   |   |   |
| Base station attempts to disconnect due to excess of maximum retransmission number |   |   |   |   |   |   |   |   |

Also, as in the third embodiment of the disclosure, when the RLC entity discards pieces of data received after the occurrence of buffer overflow and does not transmit the RLC status report until the buffer overflow is resolved, it may be difficult to delay the phenomenon in which the base station cuts the connection with the UE as in a following table. However, the method of the third embodiment of the disclosure is the simplest method in terms of implementation and implementation complexity may be reduced.

Referring to the above examples, the phenomenon in which the base station cuts the connection with the UE may be delayed for a very long time and the buffer overflow of the UE is expected to be resolved during the delayed time when the third method among the RLC status reporting methods is applied in the third embodiment of the disclosure.

In the above examples, it is assumed that the length of RLC sequence number is 3 bits, but because 16 bits or 18

|        | 0 | 1 | 2 | 3 | 4 | 5 | 6 | 7 |
|---|---|---|---|---|---|---|---|---|
| Time 0 | Received one time |   |   |   |   |   |   |   |
| Time 1 (overflow occurred) | Received one time | Received one time Discard |   |   |   |   |   |   |
| Time 2 |   |   | Received one time Discard |   |   |   |   |   |
| Time 3 Stall transmission window |   |   |   | Received one time Discard |   |   |   |   |
| Time 4 Polling |   |   |   | Received two times Discard |   |   |   |   |
| Time 5 Polling |   |   |   | Received three times Discard |   |   |   |   |
| Time 6 Polling |   |   |   | Received four times Discard |   |   |   |   |
| Time 7 Polling |   |   |   | Received five times Discard |   |   |   |   |
| Base station attempts to disconnect due to excess of maximum retransmission number |   |   |   |   |   |   |   |   | bits may be used, the phenomenon in which the base station cuts the connection with the UE may be delayed for much longer, and the buffer overflow of the UE may be resolved during the delayed time.

In the above examples, when the maximum retransmission number or polling retransmission timer value of the base station is considered, the maximum retransmission number or polling retransmission timer value of the RLC entity, which is set by the base station to the UE may be considered. This is because, in normal cases, the RLC entity of the base station and the RLC entity of the UE may be realized under the same conditions.

By applying the third method of the third embodiment of the disclosure, when the buffer overflow is detected in the reception RLC entity of the UE, instead of discarding all received pieces of data (RLC PDU), a method of receiving some of the pieces and transmitting ACK as an RLC status report may be used. For example, in an applied embodiment of the disclosure, an RLC sequence number may be tracked such that the transmission window of the transmission RLC entity is stalled and set to polling and retransmitted data is not discarded but is received. entity.

In the third embodiment of the disclosure, when the buffer overflow is detected, the RLC entity of the UE starts to discard all pieces of data received thereafter. Hereinafter, the 3-1 embodiment of the disclosure in which the pieces of data received afterward in the RLC entity of the UE are classified when discarded will be described.

The 3-1 embodiment of the disclosure relates to a method of classifying and discarding the pieces of data received after the buffer overflow is detected in the RLC entity of the UE.

In the 3-1 embodiment of the disclosure, when the buffer overflow is detected, the reception RLC entity of the UE does not discard all pieces of data received thereafter but may discard only an RLC data PDU among the received pieces of data, and receive and read an RLC control PDU.

Because the RLC control PDU is data that is read only by the reception RLC entity of the UE and discarded, the RLC control PDU does not largely affect the buffer overflow. The RLC status report (RLC status PDU) received from the base station, which is an example of the RLC control PDU, notifies about successive transmission of data transmitted from the UE to an UL based on RLC sequence numbers and thus is needed to be processed without being discarded such that the UE performs normal data transmission and retransmission to the UL. In other words, when the RLC status report (RLC status PDU) that is a type of received RLC control PDU is discarded due to occurrence of buffer overflow of the UE by DL data, the UE is unable to determine successful transmission of UL data and thus may be adversely affected.

Accordingly, even when the buffer overflow occurs, the reception RLC entity of the UE may examine headers of pieces of data (RLC PDU) received thereafter, check and obtain information by reading the RLC control PDU without discarding when the data is an RLC control PDU (for example, when the data is an RLC status report), and normally perform UL data transmission. Also, when the data is RLC data PDU upon examining the header of the data (RLC PDU), the reception RLC entity of the UE may immediately discard the data.

In other words, in the 3-1 embodiment of the disclosure, when the buffer overflow occurs, the reception RLC entity of the UE may examine the header of the data received thereafter and discard the RLC data PDU while not discarding the RLC control PDU but reading the RLC control PDU to store necessary information.

A 3-2 embodiment of the disclosure relates to another method of classifying and discarding the pieces of data received after the buffer overflow is detected in the reception RLC entity of the UE.

In the 3-2 embodiment of the disclosure, when the buffer overflow is detected, the reception RLC entity of the UE does not discard the RLC control PDU among the received pieces of data but receives and reads the RLC control PDU, does not discard but receives and reads PDCP control PDU upon examining a PDCP header among RLC data PDUs, and discards only PDCP data PDU upon examining the PDCP header among the RLC data PDUs.

Because the RLC control PDU is data that is discarded after the RLC entity reads information, the RLC control PDU is not data that does not largely affect the buffer overflow. Also, because the PDCP control PDU is data that is discarded after a PDCP entity reads information, the PDCP control PDU is data that does not largely affect the buffer overflow.

Because the RLC status report (RLC status PDU) that is an example of the RLC control PUD received from the base station notifies about successful transmission of data transmitted by the UE to UL based on RLC sequence numbers, the RLC status report needs to be processed without being discarded such that the UE performs normal data transmission and retransmission to the UL. In other words, when the RLC status report (RLC status PDU) that is a type of received RLC control PDU is discarded due to the buffer overflow of the UE by DL data, the UE is unable to determine successful transmission of the UL data and thus may be adversely affected.

Accordingly, even when the buffer overflow occurs, the reception RLC entity of the UE may examine headers of pieces of data (RLC PDU) received thereafter, check and obtain information by reading RLC control PDU without discarding when the data is RLC control PDU (for example, when the data is an RLC status report), and normally perform UL data transmission.

Also, the reception RLC entity or reception PDCP entity of the UE may examine the PDCP header of the received RLC data PDU (or RLC SDU or PDCP PDU). When the data is PDCP control PDU, for example, interspersed ROHC feedback, the data is required for header compression of the UL data of the UE, and thus should not be discarded to prevent an adverse effect on the header compression of the UL data. Accordingly, the PDCP control PDU should not be discarded. Also, when the PDCP control PDU is a PDCP status report, the PDCP control PDU indicates successful transmission of the UL data of the UE and thus should not be discarded for buffer management and effective transmission of the UL data.

Also, when the received data (RLC PDU) is an RLC data PDU (or RLC SDU or PDCP PDU) upon examining a header or is a PDCP data PDU upon examining a PDCP header, the reception RLC entity or reception PDCP entity of the UE may immediately discard the received data because the received data may be considered as data to be transmitted to an upper entity.

In other words, in the 3-2 embodiment of the disclosure, when the buffer overflow occurs, the reception RLC entity of the UE may examine the RLC header of the pieces of data received thereafter to read and store necessary information without discarding the RLC control PDU, examine the PDCP header among the RLC data PDU to read and store necessary information without discarding the RLC control PDU, and discard the PDCP control PDU among the RLC data PDU.

Figure 1M:
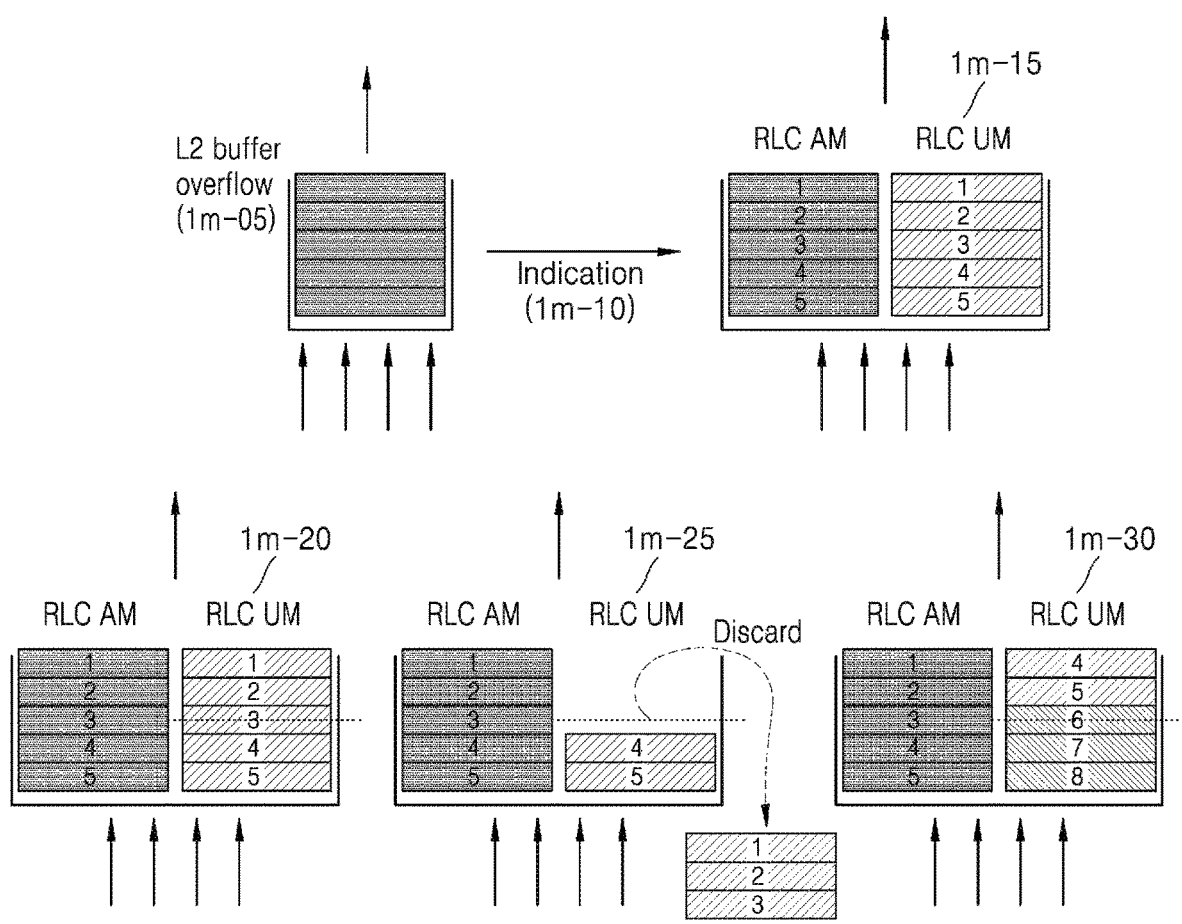
FIG. 1M is a diagram according to a fourth embodiment of the disclosure.

FIG. 1M is a diagram according to a fourth embodiment of the disclosure.

In the fourth embodiment of the disclosure, when the buffer overflow is detected based on the above conditions, data may be discarded (or dropped) with respect to data of a UM RLC entity according to bearers.

Referring to FIG. 1M, when the buffer overflow is detected in operation 1m-05, the UE may transmit an indication of the occurrence of the buffer overflow to the UM RLC entity to notify about the occurrence of the buffer overflow in operation 1m-10. Upon receiving the indication of the occurrence of the buffer overflow, the UM RLC entity may discard data received by a UM reception RLC entity 1m-15. In other words, the data discarded in the fourth embodiment of the disclosure corresponds to data that is already received, not newly received data. In an RLC UM, an RLC status report is not supported unlike an RLC AM described in the third embodiment of the disclosure, and retransmission is also not supported. Services received in the RLC UM are applied to services sensitive to transmission delay even when a loss occurs. Accordingly, upon receiving the indication of the occurrence of the buffer overflow, the UM reception RLC entity 1m-15 may start to discard, from a buffer, the oldest data among the already received data and store the newly received data for transmission to an upper entity (operations 1m-20, 1m-25, and 1m-30). The subject of data discarding procedures may not be an RLC entity, but may be an application entity or the UE itself. In other words, in the fourth embodiment of the disclosure, when the buffer overflow is detected, the RLC entity of the UE operating in the RLC UM according to bearers may discard old data from the buffer via a first in first out (FIFO) manner. In the service that is sensitive to transmission delay, it is highly likely that old data is not already valid, and thus procedures of reducing a bottleneck caused by old data processes and processing and transmitting recently received data to an upper entity may be performed. The above procedures may be performed until the reception RLC entity of the UE receives an indication of resolution of the buffer overflow.

In the above example, a valid timer may be driven for each data to determine a criterion of old data to be discarded and an old sequence may be recorded based on an RLC sequence number. In addition, the reception RLC entity of the UE may discard old data in the buffer by the amount of newly received data when the buffer overflow is detected, and may discard data corresponding to a pre-determined amount or size on regular cycles or until the overflow phenomenon is resolved.

In the above example, upon receiving the indication of the resolution of the buffer overflow, the UM reception RLC entity 1m-15 may stop the data discarding procedures.

Accordingly, based on the fourth embodiment of the disclosure, the UM reception RLC entity 1m-15 selectively discards oldest received data so as to reduce transmission delay of data received by the UM reception RLC entity 1m-15 and alleviate the buffer overflow.

In a fifth embodiment of the disclosure, when the buffer overflow is detected based on the above conditions, the PDCP entity may immediately expire a PDCP t-reordering timer, move a window, and transmit data to an upper entity to perform data processing.

As described in FIG. 1I, the buffer overflow may occur due to operations of storing pieces of data received while the PDCP t-reordering timer is driven instead of transmitting the pieces of data. Accordingly, when the buffer overflow is detected or expected in the UE, the PDCP entity may immediately expire the PDCP t-reordering timer and perform data processes by transmitting the stored pieces of data to an upper entity in an ascending order. As another method, a PDCP t-reordering timer value may be set to 0. Also, the PDCP entity may transmit data immediately to the upper entity as soon as the data is received. The above procedures may be performed until the reception PDCP entity of the UE receives the indication of the resolution of the buffer overflow. Upon receiving the indication of the resolution of the buffer overflow, the reception PDCP entity may stop the above procedures and normally drive the PDCP t-reordering timer again.

Figure 1N:
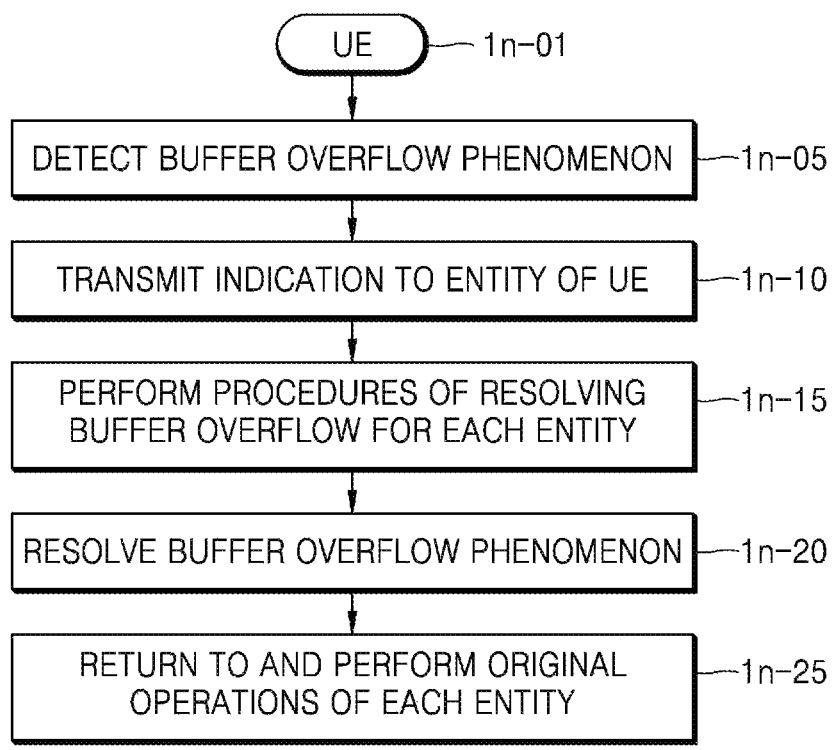
FIG. 1N is a flowchart of operations of a UE performed to resolve an overflow phenomenon, according to an embodiment of the disclosure.
Figure 10:
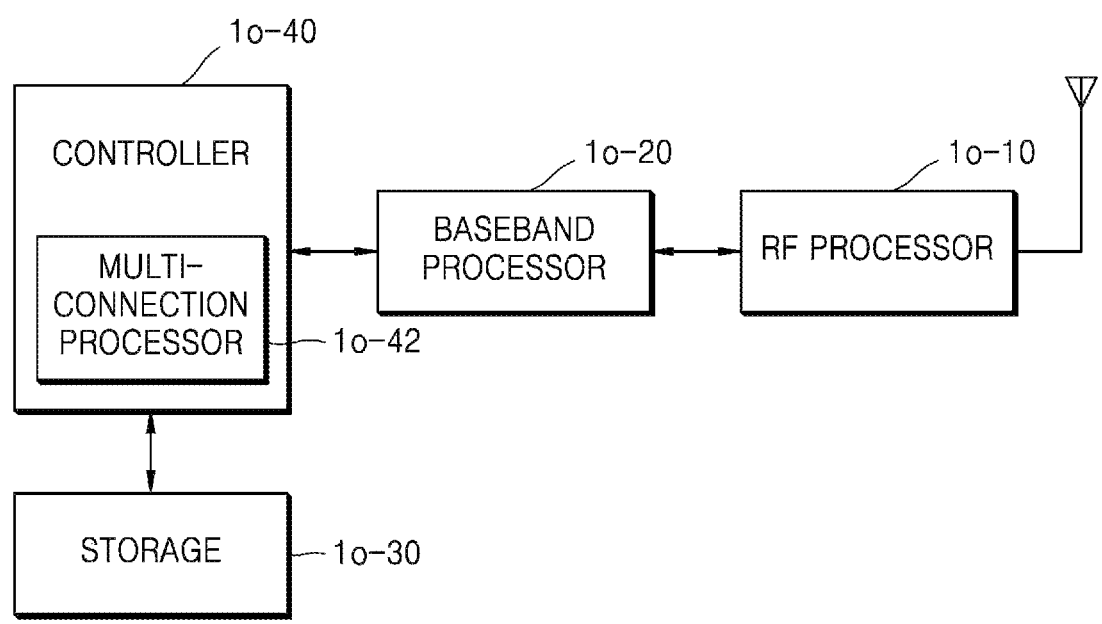

FIG. 1N is a flowchart of operations of a UE 1n-01 performed to resolve an overflow phenomenon, according to an embodiment of the disclosure.

Referring to FIG. 1N, in the disclosure, when the buffer overflow is detected based on the above conditions in operation 1n-05, the UE 1n-01 may transmit the indication of occurrence of the buffer overflow to the PHY entity, MAC entity, RLC entity, or PDCP entity in operation 1n-10. Upon receiving the indication of the occurrence of the buffer overflow in the UE 1n-01, the PHY entity, MAC, entity, RLC entity, or PDCP entity of the UE 1n-01 may perform procedures of resolving buffer overflow proposed herein according to the first through fifth embodiments of the disclosure until an indication of resolution of a buffer overflow is received, in operation 1n-15. When it is determined that the buffer overflow is resolved, the UE 1n-01 may transmit an indication of the resolution of the buffer overflow to the PHY entity, MAC entity, RLC entity, or PDCP entity, in operation 1n-20. Upon receiving the indication of the resolution of the buffer overflow, the PHY entity, MAC entity, RLC entity, or PDCP entity may perform original procedures before the buffer overflow was detected, in operation 1n-25.

FIG. 1O is a block diagram of a UE according to an embodiment of the disclosure.

Referring to FIG. 1O, the UE includes a radio frequency (RF) processor 1o-10, a baseband processor 1o-20, a storage 1o-30, and a controller 1o-40.

The RF processor 1o-10 may perform functions for transmitting and receiving signals through radio channels, e.g., signal band conversion and amplification. That is, the RF processor 1o-10 may up-convert a baseband signal provided from the baseband processor 1o-20, to a RF band signal and transmit the RF band signal through an antenna, and down-convert a RF band signal received through an antenna, to a baseband signal. For example, the RF processor 1o-10 may include a transmit filter, a receive filter, an amplifier, a mixer, an oscillator, a digital-to-analog convertor (DAC), and an analog-to-digital convertor (ADC). Although only a single antenna is illustrated in FIG. 1O, the UE may include multiple antennas. The RF processor 1o-10 may include multiple RF chains. The RF processor 1o-10 may perform beamforming. For beamforming, the RF processor 1o-10 may adjust phases and amplitudes of signals transmitted or received through multiple antennas or antenna elements. The RF processor 1o-10 may perform multiple input multiple output (MIMO) and may receive data of multiple layers in the MIMO operation. The RF processor 1o-10 may perform received beam sweeping by appropriately configuring multiple antennas or antenna elements, or adjust a direction and a beam width of the received beam to coordinate with a transmit beam, under the control of the controller 1o-40.

The baseband processor 1o-20 may convert between a baseband signal and a bitstream based on PHY entity specifications of a system. For example, for data transmission, the baseband processor 1o-20 may generate complex symbols by encoding and modulating a transmit bitstream. For data reception, the baseband processor 1o-20 may reconstruct a received bitstream by demodulating and decoding a baseband signal provided from the RF processor 1o-10. For example, according to an OFDM scheme, for data transmission, the baseband processor 1o-20 may generate complex symbols by encoding and modulating a transmit bitstream, map the complex symbols to subcarriers, and then configure OFDM symbols by performing inverse fast Fourier transformation (IFFT) and cyclic prefix (CP) insertion. For data reception, the baseband processor 1o-20 may segment a baseband signal provided from the RF processor 1o-10, in OFDM symbol units, reconstruct signals mapped to subcarriers by performing fast Fourier transformation (FFT), and then reconstruct a received bitstream by demodulating and decoding the signals.

The baseband processor 1o-20 and the RF processor 1o-10 transmit and receive signals as described above. As such, each of the baseband processor 1o-20 and the RF processor 1o-10 may also be called a transmitter, a receiver, a transceiver, or a communication unit. At least one of the baseband processor 1o-20 or the RF processor 1o-10 may include multiple communication modules to support multiple different radio access technologies. At least one of the baseband processor 1o-20 or the RF processor 1o-10 may include multiple communication modules to process signals of different frequency bands. For example, the different radio access technologies may include an LTE network, NR network, etc. The different frequency bands may include a SHF (e.g., 2.5 GHz and 5 GHz) band and a millimeter wave (mmWave) (e.g., 60 GHz) band.

The storage 1o-30 may store data for operation of the UE, e.g., basic programs, application programs, and configuration information. The storage 1o-30 may provide the stored data upon request by the controller 1o-40.

The controller 1o-40 may control overall operations of the UE. For example, the controller 1o-40 may transmit and receive signals through the baseband processor 1o-20 and the RF processor 1o-10. The controller 1o-40 records and reads data on and from the storage 1o-30. In this regard, the controller 1o-40 may include at least one processor. For example, the controller 1o-40 may include a communication processor (CP) for controlling communications and an application processor (AP) for controlling an upper entity such as an application program. In addition, the controller 1o-40 may include a multiple-connections processor 1o-42.

Figure 1P:
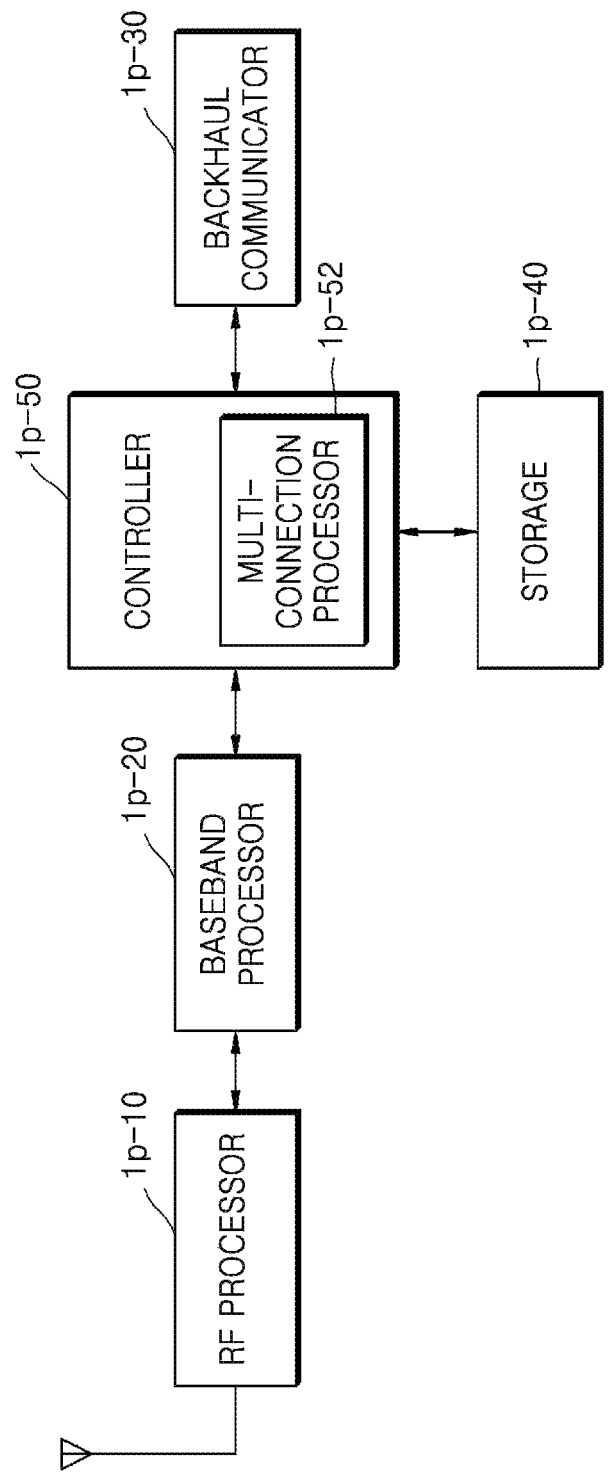
FIG. 1P is a block diagram of a base station according to an embodiment of the disclosure.

FIG. 1P is a block diagram of a base station according to an embodiment of the disclosure.

Referring to FIG. 1P, the base station may include an RF processor 1p-10, a baseband processor 1p-20, a backhaul communicator 1p-30, a storage 1p-40, and a controller 1p-50.

The RF processor 1p-10 may perform functions for transmitting and receiving signals through radio channels, e.g., signal band conversion and amplification. That is, the RF processor 1p-10 may up-convert a baseband signal provided from the baseband processor 1p-20, to a RF band signal and transmit the RF band signal through an antenna, and downconvert a RF band signal received through an antenna, to a baseband signal. For example, the RF processor 1p-10 may include a transmit filter, a receive filter, an amplifier, a mixer, an oscillator, a DAC, and an ADC. Although only a single antenna is illustrated in FIG. 1P, the RF processor 1p-10 may include multiple antennas. The RF processor 1p-10 may include multiple RF chains. The RF processor 1p-10 may perform beamforming. For beamforming, the RF processor 1p-10 may adjust phases and amplitudes of signals transmitted or received through multiple antennas or antenna elements. The RF processor 1p-10 may perform DL MIMO by transmitting data of two or more layers.

The baseband processor 1p-20 may convert between a baseband signal and a bitstream based on PHY entity specifications of a first radio access technology. For example, for data transmission, the baseband processor 1p-20 may generate complex symbols by encoding and modulating a transmit bitstream. For data reception, the baseband processor 1p-20 may reconstruct a received bitstream by demodulating and decoding a baseband signal provided from the RF processor 1p-10. For example, according to an OFDM scheme, for data transmission, the baseband processor 1p-20 may generate complex symbols by encoding and modulating a transmit bitstream, map the complex symbols to subcarriers, and then configure OFDM symbols by performing IFFT and CP insertion. For data reception, the baseband processor 1p-20 may segment a baseband signal provided from the RF processor 1p-10, in OFDM symbol units, reconstruct signals mapped to subcarriers by performing FFT, and then reconstruct a received bitstream by demodulating and decoding the signals. The baseband processor 1p-20 and the RF processor 1p-10 may transmit and receive signals as described above. As such, each of the baseband processor 1p-20 and the RF processor 1p-10 may also be called a transmitter, a receiver, a transceiver, a communicator, or a wireless communicator.

The backhaul communicator 1p-30 may provide an interface for communicating with other nodes in a network.

The storage 1p-40 may store data for operation of the base station described above, e.g., basic programs, application programs, and configuration information. In particular, the storage 1p-40 may store information about bearers allocated for a connected UE, a measurement report transmitted from the connected UE, etc. The storage 1p-40 may store criteria information used to determine whether to provide or release multi-connectivity to or from the UE. The storage 1p-40 may provide the stored data upon request by the controller 1p-50.

The controller 1p-50 may control overall operations of the base station. For example, the controller 1p-50 may transmit and receive signals through the baseband processor 1p-20 and the RF processor 1p-10 or through the backhaul communicator 1p-30. The controller 1p-50 may record and read data on and from the storage 1p-40. In this regard, the controller 1p-50 may include at least one processor. In addition, the controller 1p-50 may include a multiple-connections processor 1p-52.

According to the disclosure, occurrence of a buffer overflow is pre-detected by using a certain condition so as to reduce the effect of the buffer overflow of a UE in a next generation mobile communication system, and the buffer overflow may be processed in a lower entity before retransmission is performed in an upper entity, thereby efficiently solving the buffer overflow in terms of system delay and using transmission resources.

The methods according to the embodiments of the disclosure described in the claims or the detailed description may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments of the disclosure described in the claims or the detailed description.

The programs (e.g., software modules or software) may be stored in RAM, non-volatile memory including flash memory, read-only memory (ROM), electrically erasable programmable ROM (EEPROM), a magnetic disc storage device, a compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the disclosure. Another storage device on the communication network may also be connected to the apparatus performing the embodiments of the disclosure.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A terminal for controlling a data receiving rate in a wireless communication system, the terminal comprising:
   a transceiver; and
   at least one processor configured to:
      identify a buffer overflow based on at least one of the remaining capacity of the buffer or the amount of data stored in the buffer,
      determine whether first data in a buffer of the terminal is necessary to be discarded based on buffer status,
      when the first data in the buffer of the terminal is necessary to be discarded, discard the first data except a control protocol data unit (PDU),
      disconnect a connection with a base station based on the identified the buffer overflow, and
      reestablish the connection with the base station.

2. The terminal of claim 1, wherein the buffer overflow is being resolved during reestablishing the connection with the base station.

3. The terminal of claim 1, wherein the buffer overflow is identified when the first data in the buffer of the terminal is necessary to be discarded, when the amount of data stored in the buffer exceeds a predetermined threshold.

4. The terminal of claim 1, wherein the at least one processor is further configured to:
   receive, from the base station, second data and the first data, and
   in response to discarding the first data except the control PDU, transmit, to the base station, a data status report indicating ACK for the second data and NACK for the first data.

5. The terminal of claim 1,
   wherein the buffer overflow is identified as a buffer overflow in at least one of a Packet Data Convergence Protocol (PDCP) entity or a Radio Link Control (RLC) entity, and
   wherein the at least one processor is further configured to:
      stop transmission of a data status report for a first data radio bearer (DRB) to the base station.

6. The terminal of claim 1,
   wherein the buffer overflow is identified as a buffer overflow in at least one of a Medium Access Control (MAC entity) or a physical entity, and
   wherein the at least one processor is further configured to:
      transmit, to the base station, a request to stop data transmission by the physical entity through layer 1 (L1) signaling.

7. The terminal of claim 6, wherein the request to stop data transmission comprises Channel Quality Indicator (CQI).

8. The terminal of claim 1, wherein the at least one processor is further configured to:
   receive, from the base station, data comprising the first data,
   store a sequence number of the discarded first data, and
   transmit, to the base station, a data status report based on the stored sequence number when the connection between the base station and the terminal is established.

9. The terminal of claim 1, wherein the control PDU comprises at least one of a Radio Link Control (RLC) control PDU or a Packet Data Convergence Protocol (PDCP) control PDU.

10. A method, performed by a terminal, for controlling a data receiving rate in a wireless communication system, comprising:
    identifying a buffer overflow based on at least one of the remaining capacity of the buffer or the amount of data stored in the buffer;
    determining whether first data in a buffer of the terminal is necessary to be discarded based on buffer status;
    when the first data in the buffer of the terminal is necessary to be discarded, discarding the first data except a control protocol data unit (PDU);
    disconnecting a connection with a base station based on the identified the buffer overflow; and
    reestablishing the connection with the base station.

11. The method of claim 10, wherein the buffer overflow is being resolved during reestablishing the connection with the base station.

12. The method of claim 10, wherein the buffer overflow is identified when the first data in the buffer of the terminal is necessary to be discarded, when the amount of data stored in the buffer exceeds a predetermined threshold.

13. The method of claim 10, wherein the method further comprises:
    receiving, from the base station, second data and the first data; and
    in response to discarding the first data except the control PDU, transmitting, to the base station, a data status report indicating ACK for the second data and NACK for the first data.

14. The method of claim 10,
wherein the buffer overflow is identified as a buffer overflow in at least one of a Packet Data Convergence Protocol (PDCP) entity or a Radio Link Control (RLC) entity, and
wherein the method further comprises:
stopping transmission of a data status report for a first data radio bearer (DRB) to the base station.

15. The method of claim 10,
wherein the buffer overflow is identified as a buffer overflow in at least one of a Medium Access Control (MAC entity) or a physical entity, and
wherein the method further comprises:
transmitting, to the base station, a request to stop data transmission by the physical entity through layer 1 (L1) signaling.

16. The method of claim 15, wherein the request to stop data transmission comprises Channel Quality Indicator (CQI).

17. The method of claim 10, further comprising:
receiving, from the base station, data comprising the first data;
storing a sequence number of the discarded first data; and
transmitting, to the base station, a data status report based on the stored sequence number when the connection between the base station and the terminal is established.

18. The method of claim 10, wherein the control PDU comprises at least one of a Radio Link Control (RLC) control PDU or a Packet Data Convergence Protocol (PDCP) control PDU.

* * * * *